US008895790B2

(12) United States Patent
Narayanaswamy et al.

(10) Patent No.: US 8,895,790 B2
(45) Date of Patent: Nov. 25, 2014

(54) CONVERSION OF PLASTICS TO OLEFIN AND AROMATIC PRODUCTS

(71) Applicants: Ravichander Narayanaswamy, Bangalore (IN); Krishna Kumar Ramamurthy, Bangalore (IN); P. S. Sreenivasan, Bangalore (IN)

(72) Inventors: Ravichander Narayanaswamy, Bangalore (IN); Krishna Kumar Ramamurthy, Bangalore (IN); P. S. Sreenivasan, Bangalore (IN)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/764,886

(22) Filed: Feb. 12, 2013

(65) Prior Publication Data

US 2014/0228204 A1 Aug. 14, 2014

(51) Int. Cl.
 *C10G 1/10* (2006.01)
 *C10G 1/08* (2006.01)
 (Continued)

(52) U.S. Cl.
 CPC . *C10G 1/10* (2013.01); *B01J 29/40* (2013.01); *B01J 29/80* (2013.01); *B01J 29/82* (2013.01); *B01J 29/85* (2013.01); *B01J 35/1019* (2013.01); *C10G 11/18* (2013.01); *B01J 2029/062* (2013.01)
 USPC .......... 585/241; 585/240; 585/469; 208/118; 208/120.01; 502/60; 502/67; 502/71; 502/73; 502/77

(58) Field of Classification Search
 USPC ....................................................... 585/648
 See application file for complete search history.

(56) References Cited

U.S. PATENT DOCUMENTS

| 4,746,406 A | 5/1988 | Timmann |
| 4,851,601 A | 7/1989 | Fukuda |

(Continued)

FOREIGN PATENT DOCUMENTS

| CA | 1050956 | * | 3/1979 |
| CN | 1246510 | | 3/2000 |

(Continued)

OTHER PUBLICATIONS

Manos et al., 2000, Catalytic degradation of high-density polyethylene over different zeolitic structures, Ind. Eng. Chem. Res. vol. 39, pp. 1198-1202.*

(Continued)

*Primary Examiner* — In Suk Bullock
*Assistant Examiner* — Youngsul Jeong
(74) *Attorney, Agent, or Firm* — Paul I. Herman; Gino C. Catena; Grady K. Bergen

(57) ABSTRACT

A catalyst composition useful for producing olefins and aromatic compounds from a feedstock is formed from a fluidized catalytic cracking (FCC) catalyst and a ZSM-5 zeolite catalyst, wherein the amount of ZSM-5 zeolite catalyst makes up from 10 wt. % or more by total weight of the FCC catalyst and the ZSM-5 zeolite catalyst. The catalyst composition may be used in a method of producing olefins and aromatic compounds from a feedstock by introducing a hydrocarbon feedstock and the catalyst composition within a reactor, at least a portion of the reactor being at a reactor temperature of 550° C. or higher. The feedstock and catalyst composition are introduced into the reactor at a catalyst-to-feed (C/F) ratio of from 6 or greater.

21 Claims, 12 Drawing Sheets

(51) Int. Cl.
*B01J 29/40* (2006.01)
*B01J 29/80* (2006.01)
*B01J 29/82* (2006.01)
*B01J 29/85* (2006.01)
*B01J 35/10* (2006.01)
*C10G 11/18* (2006.01)
*C10G 11/00* (2006.01)
*C10G 11/02* (2006.01)
*C07C 4/02* (2006.01)
*C07C 4/06* (2006.01)
*B01J 29/06* (2006.01)

(56) References Cited

U.S. PATENT DOCUMENTS

| | | | |
|---|---|---|---|
| 4,871,426 A | 10/1989 | Lechert | |
| 4,941,952 A | 7/1990 | Betz | |
| 5,079,385 A * | 1/1992 | Wu | 585/241 |
| 5,136,117 A | 8/1992 | Paisley | |
| 5,354,930 A | 10/1994 | Atkins | |
| 5,364,995 A | 11/1994 | Kirkwood | |
| 5,447,622 A * | 9/1995 | Kerby et al. | 208/78 |
| 5,481,052 A | 1/1996 | Hardman et al. | |
| 5,744,668 A * | 4/1998 | Zhou et al. | 585/241 |
| 5,821,395 A | 10/1998 | Price | |
| 6,797,155 B1 * | 9/2004 | Chester et al. | 208/114 |
| 6,866,830 B2 | 3/2005 | Kwak | |
| 7,932,424 B2 | 4/2011 | Fujimoto | |
| 7,976,696 B2 | 7/2011 | Ying | |
| 7,981,273 B2 | 7/2011 | Nicholas | |
| 8,007,663 B2 | 8/2011 | Ying | |
| 8,008,223 B2 | 8/2011 | Garcia-Martinez | |
| 2005/0239634 A1 | 10/2005 | Ying et al. | |
| 2007/0083071 A1 | 4/2007 | Choi et al. | |
| 2007/0173673 A1 | 7/2007 | Fujimoto et al. | |
| 2008/0035528 A1 | 2/2008 | Marker | |
| 2009/0227823 A1 | 9/2009 | Huber et al. | |
| 2010/0210782 A1 | 8/2010 | Fader | |
| 2010/0212215 A1 | 8/2010 | Agblevor | |
| 2011/0127193 A1 | 6/2011 | Xie et al. | |
| 2011/0154720 A1 | 6/2011 | Bartek et al. | |
| 2011/0163002 A1 * | 7/2011 | White et al. | 208/95 |
| 2011/0166397 A1 | 7/2011 | Fujimoto et al. | |
| 2011/0178347 A1 | 7/2011 | Feugnet et al. | |
| 2011/0207979 A1 | 8/2011 | Kim et al. | |
| 2011/0207984 A1 | 8/2011 | Almeida et al. | |
| 2012/0203042 A1 | 8/2012 | Huber et al. | |

FOREIGN PATENT DOCUMENTS

| | | |
|---|---|---|
| CN | 1462790 | 12/2003 |
| DE | 4329434 A1 | 3/1995 |
| DE | 4417386 A1 | 3/1995 |
| DE | 4413093 A1 | 11/1995 |
| EP | 124716 A2 | 11/1984 |
| EP | 297408 A2 | 1/1989 |
| EP | 502618 A1 | 9/1992 |
| EP | 659867 A2 | 6/1995 |
| EP | 2027918 A1 | 2/2005 |
| EP | 2334759 A1 | 6/2011 |
| EP | 2351820 A2 | 8/2011 |
| EP | 2364342 A1 | 9/2011 |
| JP | 57121093 A | 7/1982 |
| JP | 57209988 A | 12/1982 |
| JP | 9221681 A | 8/1997 |
| JP | 2000095894 A | 4/2000 |
| JP | 2001316517 A | 11/2001 |
| JP | 2002088375 A | 3/2002 |
| JP | 2002121318 A | 4/2002 |
| JP | 2003105125 A | 4/2003 |
| JP | 2003119472 A | 4/2003 |
| JP | 2003654858 B2 | 6/2005 |
| JP | 2005154510 A | 6/2005 |
| JP | 2005154517 A | 6/2005 |
| TW | 265174 B | 11/2006 |
| TW | 200720329 A | 6/2007 |
| WO | 8700082 | 1/1987 |
| WO | 9424228 A1 | 10/1994 |
| WO | 9718892 A1 | 5/1997 |
| WO | 0066656 A1 | 11/2000 |
| WO | 0105908 A1 | 1/2001 |
| WO | 0301009 A1 | 2/2003 |
| WO | 03010258 A1 | 2/2003 |
| WO | 2005094990 A1 | 10/2003 |
| WO | 2005061673 | 7/2005 |
| WO | 2007086348 A1 | 8/2007 |
| WO | 2008126040 A2 | 10/2008 |
| WO | 2011103026 A1 | 8/2011 |
| WO | 2011103697 A1 | 9/2011 |
| WO | 2011115785 A1 | 9/2011 |

OTHER PUBLICATIONS

Grittner N., et al, Fluid bed pyrolysis of anhydride-hardened epoxy resins and polyether-polyurethane by the Hamburg process, Journal of Analytical and Applied Pyrolysis, Jun. 1993, 293-299, vol. 25 (Abstract only).

W. Kaminsky, et al, Fluidized Bed Pyrolysis of Oil Sand and Oil Shale, German Chemical Engineering, 1983, 306-311, vol. 6—Issue 5 (Abstract only).

W. Kaminsky, Pyrolysis of plastic waste and scrap tyres in a fluid bed reactor, Resource Recovery and Conservation, 1980, 205-216, vol. 5—Issue 3 (Abstract only).

W. Kaminsky, et al, Industrial prototypes for the pyrolysis of used tyres and waste plastic materials, Chem. Ingenieur Techn, 1979, 419-429, vol. 51—Issue 5 (Abstract only).

W. Kaminsky, et al, Pyrolysis of Plastics Wastes and Used Tyres in a Fluidised Bed Reactor, Kunstst Ger Plast, 1978, 14-17, vol. 68—Issue 5 (Abstract only).

H. Sinn, et al, Production of Chemical Raw Materials from Plastics Waste and Wastetires by Means of Pyrolysis, Dechema Monogr, 1976, 1616-1638, vol. 80 (Abstract only).

H. Sinn, et al, Processing of synthetic material residues and used tyres to give chemical raw materials, especially by pyrolysis, Angewandte Chemie, 1976, 737-750, vol. 88—Issue 22 (Abstract only).

W. Kaminsky, et al, Recycling of plastics, Conservation and Recycling, 1976, 91-110, vol. 1—Issue 1 (Abstract only).

J.-S. Kim, et al, Recycling of a fraction of municipal plastic wastes depleted in chlorine for a feedstock in a steam cracker, Polymer Recycling, 1997, 55-59, vol. 3—Issue 1 (Abstract only).

T. Bhasker, et al, Effect of polyethylene terephthalate (PET) on the pyrolysis of brominated flame retardant-containing high-impact polystyrene (HIPS-Br), Journal of Material Cycles and Waste Management, Nov. 2010, 332-340, vol. 12—Issue 4 (Abstract only).

N. Miskolczi, et al, Thermogravimetric analysis and pyrolysis kinetic study of Malaysian refuse derived fuels, Journal of the Energy Institute, 2010, 125-132, vol. 83—Issue 3 (Abstract only).

I.F. Elbaba, et al, Quantification of polybrominated diphenyl ethers in oil produced by pyrolysis of flame retarded plastic, Journal of the Energy Institute, 2008, 158-163, vol. 81—Issue 3 (Abstract only).

W.J. Hall, et al, Pyrolysis of waste electrical and electronic equipment: Effect of antinomy trioxide on the pyrolysis of styrenic polymers, Environmental Technology, 2007, 1045-1054, vol. 28—Issue 9 (Abstract only).

R. Marsh, et al, Thermal degradation of polyethylene film materials due to successive recycling, Journal of Mechanical Engineering Science, 2006, 1099-1108, vol. 220—Issue 8 (Abstract only).

P.T. Williams, et al, Recovery of value-added products from the pyrolytic recycling of glass-fibre-reinforced composite plastic waste, Journal of the Energy Institute, 2005, 51-61, vol. 78—Issues 2 (Abstract only).

A.M. Cunliffe, et al, Recycling of composite plastics in construction and demolition waste by pyrolysis, Proceedings of the International Conference on Sustainable Waste Management and Recycling: Construction Demolition Waste, 2004, 341-348 (Abstract only).

A.M. Cunliffe, et al, Pyrolysis of flame retardant brominated polyester composites, Environmental Technology, 2004, 1349-1356, vol. 25—Issue 12 (Abstract only).

(56) References Cited

OTHER PUBLICATIONS

Paul T. Williams, et al, Hydrocarbon gases and oils from the recycling of polystyrene waste by catalytic pyrolysis, International Journal of Energy Research, 2004, 31-44, vol. 28—Issue 1 (Abstract only).
Paul T. Williams, et al, Recovery of fibres, fuels and chemicals from the pyrolysis of fibre reinforced composite plastic waste, Proceedings of the International Symposium, 2003, 127-136, Recycling and Reuse of Waste Materials (Abstract only).
Paul T. Williams, Recycling tricky materials using pyrolysis, Materials World, 2003, 24-36, vol. 11 Issue 7 (Abstract only).
R. Bagri, et al, Fluidised-bed catalytic pyrolysis of polystyrene, Journal of the Institute of Energy, 2002, 117-123, vol. 75 (Abstract only).
R. Bagri, et al, Composition of products from the catalytic pyrolysis of plastics, Proceedings of the TMS Fall Extraction and Processing Conference, 1999, 357-366, vol. 1 (Abstract only).
Paul T. Williams, et al, Product composition from the fast pyrolysis of polystyrene, Environmental Technology, 1999, 1109-1118, vol. 20 Issue 11 (Abstract only).
Paul T. Williams, et al, Recycling plastic waste by pyrolysis, Journal of the Institute of Energy, 1998, 81-93, vol. 71 (Abstract only).
E. A. Williams, et al, The pyrolysis of individual plastics and a plastic mixture in a fixed bed reactor, Journal of Chemical Technology and Biotechnology, 1997, 9-20, vol. 70 Issue 1 (Abstract only).
Paul T. Williams, et al, Polycyclic aromatic hydrocarbons in polystyrene derived pyrolysis oil, Journal of Analytical and Applied Pyrolysis, 1993, 325-334, vol. 25 C (Abstract only).
Paul T. Williams, et al, Pyrolysis of municipal solid waste, Journal of the Institute of Energy, 1992, 192-200, vol. 65 (Abstract only).
Y.H. Lin, et al, Catalytic degradation of high density polyethylene over mesoporous and microporous catalysts in a fluidised-bed reactor, Polymer Degradation and Stability, 2004, 121-128, vol. 86, Department of Chemical Engineering, Kao Yung Institute of Technology, Taiwan, Republic of China.
Y.H. Lin, et al, Deactivation of US-Y zeolite by coke formation during the catalytic pyrolysis of high density polyethylene, Thermochimica Acta, 1997, 45-50, vol. 294, Environmental Technology Centre, Department of Chemical Engineering, Manchester, UK.
Y. H. Lin, et al, Catalytic pyrolysis of polyolefin waste into valuable hydrocarbons over reused catalyst from refinery FCC units, applied Catalysis A: General, 2007,132-139, vol. 328, Department of Chemical and Biochemical Engineering, Kao Yuan University, Kaohsiung, Taiwan, ROC.
Hung-Ta Lin, et al, Hydrocarbons fuels produced by catalytic pyrolysis of hospital plastic wastes in a fluidizing cracking process, Fuel Process Technology, 2010, Department of Dentistry, Cathay General Hospital, Taipei, Taiwan.
Y. H. Lin, et al, Production of valuable hydrocarbons by catalytic degradation of a mixture of post-consumer plastic waste in a fluidized-bed reactor, Polymer Degradation and Stability, 2009, 1924-1931, vol. 94 Department of Chemical and Biochemical Engineering, Kaohsiung, Taiwan, ROC.
Y. H. Lin, et al, Tertiary Recycling of Commingled Polymer Waste Over Commercial FCC Equilibrium Catalysts for Producing Hydrocarbons, Polymer Degradation and Stability, 2009, 25-33, vol. 94, Department of Chemical and Biochemical Engineering, Kao Yuan University, Kaohsiung, Taiwan, ROC.
Y. H. Lin, et al, Acid-Catalyzed Conversion of Chlorinated Plastic Waste Into Valuable Hydrocarbons Over Post-Use Commercial FCC Catalysts, Journal of Analytical and Applied Pyrolysis, 2010, 154-162, vol. 87, Deparment of Chemical and Biochemical Engineering, Kao Yuan University, Kaohsiung, Taiwan, TOC.
Y. H. Lin, et al, A Combined Kinetic and Mechanistic Modelling of the Catalytic Degradation of Polymers, Journal of Molecular Catalysis, 2001, 143-151, vol. 171, R&D Department, Kaohsiung Chemistry, Taiwan, Republic of China.
T. T. Wei, et al, Chemical Recycling of Post-Consumer Polymer Waste Over Fluidizing Cracking Catalysts for Producing Chemical and Hydrocarbon Fuels, Resources, Conservation and Recycling, 2010, 952-961, vol. 54, Department of Chemical and Biochemical Engineering, Kao Yuan University, Kaohsiung, Taiwan, ROC.
Y. H. Lin, et al, Tertiary Recycling of Polyethylene Waste by Fluidised-bed Reactions in the Presence of Various Cracking Catalysts, Journal of Analytical and Applied Pyrolysis, 2008, 101-109, vol. 83, Department of Chemical and Biochemical Engineering, Kao Yuan University, Taiwan, Republic of China.
I.F. Elbaba, et al, Catalytic Pyrolysis-Gasification of Waste Tire and Tire Elastomers for Hydrogen Production, Energy Fuels, 2010, 3928-3935, vol. 24.
G. Elordi, et al, Product Distribution Modelling in the Thermal Pyrolysis of High Density Polyethylene, Journal of Hazardous Materials, 2007, 708-714, vol. 144.
G. Elordi, et al, Role of Pore Structure in the Deactivation of Zeolites by Coke in the Pyrolysis of Polyethylene in a Conical Spouted Bed Reactor, Applied Catalysts B: Environmental, 2011, 224-231, vol. 102.
E. A. Williams, et al, Analysis of Products Derived From the Fast Pyrolysis of Plastic Waste, Journal of Analytical and Applied Pyrolysis, 1997, 347-363, vol. 40-41.
W. J. Hall, et al, Analysis of Products from the Pyrolysis of Plastics Recovered from the Commercial Scale Recycling of Waste Electrical and Electronic Equipment, Journal of Analytical and Applied Pyrolysis, 2007, 375-386, vol. 79.
P.T. Williams, et al, Analysis of Products from the Pyrolysis and Liquefaction of Single Plastics and Waste Plastic Mixtures, Conservation and Recycling, 2007, 754-769, vol. 51, Resources.
C. Wu, et al, A Novel Ni—Mg—Al—CaO Catalyst with the Dual Functions of Catalysis and CO2 Sorption for H2 Production from the Pyrolysis-Gasification of Polypropylene, Fuel, 2010, 1435-1441, vol. 89.
C. Wu et al, Ni/CeO2/ZSM-5 Catalysts for the Production of Hydrogen from the Pyrolysis-Gasification of Polypropylene, International Journal of Hydrogen Energy, 2009, 6242-6252, vol. 34.
A.M. Cunliffe, et al, Characterisation of Products from the Recycling of Glass Fibre Reinforced Polyester Waste by Pyrolysis, Fuel, 2003, 2223-2230, vol. 82.
W. Kaminsky, Chemical Recycling of Mixed Plastics by Pyrolysis, Advances in Polymer Technology, 1995, 337-344, vol. 14 No. 4.
J.A. Onwudili, et al, Composition of Products from the Pyrolysis of Polyethylene and Polystyrene in a Closed Batch Reactor: Effects of Temperature and Residence Time, Journal of Analytical and Applied Pyrolysis, 2009, 293-303, vol. 86.
N.M.M. Mitan, et al, Effect of Decabromodiphenyl Ether and Antimony Trioxide on Controlled Pyrolysis of High-Impact Polystyrene Mixed with Polyolefins, Chemosphere, 2008, 1073-1079, vol. 72.
T. Bhaskar, et al, Controlled Pyrolysis of Polyethylene/ Polypropylene/Polystyrene Mixed Plastics with High Impact Polystyrene Containing Flame Retardant: Effect of Decabromo Diphenylethane (DDE), Polymer Degradation and Stability, 2007, 211-221, vol. 92.
A.B. Ross, et al, Development of Pyrolysis—GC with Selective Detection: Coupling of Pyrolysis-GC to Atomic Emission Detection (py-GC-AED), Journal of Analytical and Applied Pyrolysis, 2001, 371-385, vol. 58-59.
W. J. Hall, et al, Fast Pyrolysis of Halogenated Plastics Recovered from Waste Computers, Energy & Fuels, 2006, 1536-1549, vol. 20.
W. Kaminsky, et al, Feedstock Recycling of Polymers by Pyrolysis in a Fluidised Bed, Polymer Degradation and Stability, 2004, 1045-1050, vol. 85.
W. Kaminsky, Feedstock Recycling by Pyrolysis in a Fluidized Bed, Institute for Technical and Macromolecular Chemistry University of Hamburg, Hamburg, Germany.
W.J. Hall, et al, Thermal Processing of Toxic Flame-Retarded Polymers Using a Waste Fluidized Catalytic Cracker (FCC) Catalyst, Energy & Fuels, 2008, 1691-1697, vol. 22, Leeds, United Kingdom.
Paul T. Williams, et al, Fluidised Bed Pyrolysis of Low Density Polyethylene to Produce Petrochemical Feedstock, Journal of Analytical and Applied Pyrolysis, 1999, 107-126, vol. 51 Department of Fuel and Energy, Leeds, United Kingdom.
C. Wu, et al, Hydrogen Production by Steam Gasification of Polypropylene with Various Nickel Catalysts, Applied Catalysis B:

(56) References Cited

OTHER PUBLICATIONS

Environmental, 2009, 152-161, vol. 87, Energy & Resources Research Institute, Leeds, United Kingdom.

Walter Kaminsky, et al, Catalytical and Thermal Pyrolysis of Polyolefins, Journal of Analytical and Applied Pyrolysis, 2007, 368-374, vol. 79, University of Hamburg, Institute of Technical and Macromolecular Chemistry, Hamburg, Germany.

J. Mertinkat, et al, Cracking Catalysts Used as Fluidized Bed Material in the Hamburg Pyrolysis Process, Journal of Analytical and Applied Pyrolysis, 1999, 87-95, vol. 49, University of Hamburg, Institute of Technical and Macromolecular Chemistry, Hamburg, Germany.

M. Predel, et al, Pyrolysis of Mixed Polyolefins in a Fluidised-Bed Reactor and on a Pyro-GC/MS to Yield Aliphatic Waxes, 2000, 373-385, vol. 70, Institute of Technical and Macromolecular Chemistry, University of Hamburg, Hamburg, Germany.

W. Kaminsky, et al, Olefins from Polyoflefins and Mixed Plastics by Pyrolysis, Journal of Analytical and Applied Pyrolysis, 1995, 19-27, vol. 32, University of Hamburg, Institute for Technical and Macromolecular Chemistry, Hamburg, Germany.

Gorka Elordi, et al, Products Yields and Compositions in the Continuous Pyrolysis of High-Density Polyethylene in a Conical Spouted Bed Reactor, Industrial & Engineering Chemistry Research, Department of Chemical Engineering, Bilbao, Spain.

C. Wu, et al, Hydrogen Production from the Pyrolysis-Gasification of Polypropylene: Influence of Steam Flow Rate, Carrier Gas Flow Rate and Gasification Temperature, Energy Fuels, 2009, 5055-5061, vol. 23, Energy and Resources Research Institute, Leeds, United Kingdom.

M. Olazar, et al, Influence of FCC Catalyst Steaming on HDPE Pyrolsis Product Distribution, Journal of Analytical and Applied Pyrolysis, 2009, 359-365, vol. 85, University of Basque Country, Bilbao, Spain.

A. Lopez, et al, Influence of Time and Temperature on Pyrolysis of Plastic Wastes in a Semi-Batch Reactor, Chemical Engineering Journal, 2011, 62-71, vol. 173, Chemical and Environmental Department, School of Engineering of Bilbao, Bilbao, Spain.

Paul T. Williams, et al, Interaction of Plastics in Mixed-Plastics Pyrolysis, Energy & Fuels, 1999, 188-196, Department of Fuel and Energy, The University of Leeds, Leeds, United Kingdom.

C. Wu, et al, Investigation of Ni—Al, Ni—Mg—Al and Ni—Cu—Al Catalysts for Hydrogen Production from Pyrolysis-Gasification of Polypropylene, Applied Catalysis B: Environmental, 2009, 147-156, vol. 90, Energy & Resources research Institute, The University of Leeds, Leeds, United Kingdom.

C. Wu, et al, Investigation of Coke Formation Ni—Mg—Al Catalyst for Hydrogen Production from the Catalytic Steam Pyrolysis-Gasification of Polypropylene, Applied Catalysis B: Enviromental, 2010, 198-207, vol. 96, Energy & Resources Research Institute, The University of Leeds, Leeds, United Kingdom.

W. Kaminsky, Recycling of Polymer by Pyrolysis, Journal de Physique, 1993, 1543-1552, vol. 3, Institute for Technical and Macromolecular Chemistry, University of Hamburg, Hamburg, Germany.

S. T. Kenny, et al, Up-Cycling of PET to the Biodegradable Plastic PHA, Environ. Sci. Technol., 2008, 7696-7701, vol. 42, Dublin, Republic of Ireland.

J. S. Kim, et al, Pyrolysis of a Fraction of Mixed Plastic Wastes Depleted in PVC, Journal of Analytical and Applied Pyrolysis, 1997, 365-372, vol. 40-41, University of Hamburg, Institute of Technical and Macromolecular Chemistry, Hamburg, Germany.

Roberto Aguado, et al, Kinetic Study of Polyolefin Pyrolysis in a Conical Spouted Bed Reactor, Ind. Eng. Chem. Res., 2002, 4559-4566, vol. 41, Departamento de Ingenieria Quimica, Universidad del Pais Vasco, Bilbao, Spain.

Roberto Aguado, et al, Kinetics of Polystyrene Pyrolysis in a Conical Spouted Bed Reactor, Chemical Engineering Journal, 2003, 91-99, vol. 92, Departamento de Ingenieria Quimica, Universidad del Pais Vasco, Bilbao, Spain.

W. Kaminsky, et al, Pyrolysis of Mixed Plastics into Aromatics, Journal of Analytic and Applied Physics, 1999,127-134, vol. 51, University of Hamburg, Institute for Technical and Macromolecular Chemisty, Hamburg, Germany.

Roberto Aguado, et al, Defluidization Modelling of Pyrolysis of Plastics in a Conical Spouted Bed Reactor, 2005, 231-235, vol. 44, Departamento de Ingenieria Quimica, Facultad de Ciencias, Universidad del Pais Vasco, Bilbao, Spain.

W. Kaminsky, et al, Monomer Recovery by Pyrolysis of Poly(methyl methacrylate) (PMMA), Journal of Analytical and Applied Pyrolysis, 1991, 311-318, vol. 19, Elsevier Science Publishers B.V., Amsterdam.

Walter Kaminsky, et al, Feedstock Recycling of Synthetic and Natural Rubber by Pyrolysis in a Fluidized Bed, Journal of Analytical and Applied Pyrolysis, 2008, 4, Elsevier, Hamburg, Germany.

M. Artetxe, et al, Operating Conditions for the Pyrolysis of Poly-(ethylene terephthalate) in a Conical Spouted-Bed Reactor, Ind. Eng. Chem. Res., 2010, 2064-2069, vol. 49, University of the Basque Coutnry, Department of Chemical Engineering, Bilbao, Spain.

T. Yoshioka, et al, Pyrolysis of poly(ethylene terephthalate) in a Fluidised Bed Plant, Polymer Degradation and Stability, 2004, 499-504, vol. 86, Environmental Conservation Research INstittue, Tohoku University, Aoba-ku Sendai, Japan.

Walter Kaminsky, et al, Pyrolysis of Filled PMMA for Monomer Recovery, Journal of Analytical and Applied Pyrolysis, 2001,781-787, vol. 58-59, University of Hamburg, Institute for Technical and Macromolecular Chemistry, Hamburg, Germany.

Y.-H. Lin, et al, Fluidised Bed Pyrolysis of Polypropylene Over Cracking Catalysts for Producing Hydrocarbons, Polymer degradation and Stability, 2005, 101-108, vol. 89, Department of Biochemical Engineering & Graduate Institute of Environmental Polymeric Materials, Kao Yuan Institute of Technology, Kaohsiung, Taiwan, ROC.

N. Miskolczi, et al, Production of Oil with Low Organobromine Content from the Pyrolysis of Flame Retarded HIPS and ABS Plastics, Journal of Analytical and Applied Pyrolysis, Department of Hydrocarbon and Coal Processing, University of Pannonia, Veszprem, Hungary.

C. Wu, et al, Pyrolysis-Gasification of Plastics, Mixed Plastics and Real-World Plastic Waste with and without Ni—Mg—Al Catalyst, Fuel, Energy & Resources Research Institute, The University of Leeds, Leeds, United Kingdom.

C. Wu, et al, Pyrolysis-Gasification of Post-Consumer Municipal Solid Plastic Waste for Hydrogen Production, International Journal of Hydrogen Energy, 2010, 949-957, vol. 35, Energy & Resources Institute, The University of Leeds, Leeds, UK.

W. J. Hall, et al Pyrolysis of Brominated Feedstock Plastic in a Fluidised Bed Reactor, Journal of Analytical and Applied Pyrolysis, 2006, 75-82, vol. 77, Energy and Resources Research Institute, University of Leeds, Leeds, UK.

A. M. Cunliffe, et al, Recycling of Fibre-Reinforced Polymeric Waste by Pyrolysis: Thermo-Gravimetric and Bench-Scale Investigation, Journal of Analytical and Applied Pyrolysis, 2003, 315-338, vol. 70, Department of Fuel and Energy, The University of Leeds, Leeds, United Kingdom.

A. Lopez, et al, Pyrolysis of Municipal Plastic Wastes II: Influence of Raw Material Composition Under Catalytic Conditions, Waste Management, 2011, 1973-1983, vol. 31, Chemical and Environmental Engineering Department, School of Engineering of Bilbao, Alda, Urquijo, Bilbao Spain.

A. Lopez, et al, Pyrolysis of Municipal Plastic Wastes: Influence of Raw Material Composition, Waste Management, 2010, 620-627, vol. 30, Chemical and Environmental Engineering Department, School of Engineering of Bilbao, Alda, Urquijo, Bilbao, Spain.

H. Schmidt, et al, Pyrolysis of Oil Sludge in a Fluidised Bed Reactor, Chemosphere, 2001, 285-290, vol. 45, Institute of Techinical and Macromolecular Chemistry, University of Hamburg, Hamburg, Germany.

C. M. Simon, et al. Pyrolysis of Polyolefins with Steam to Yield Olefins, Journal of Analytical and Applied Pyrolysis, 1996, 75-87, vol. 38, University of Hamburg, Institute for Technical and Macromolecular Chemistry, Hamburg, Germany.

(56) References Cited

OTHER PUBLICATIONS

I.D. Marco, et al, Pyrolysis of the Rejects of a Waste Packaging Separation and Classification Plant, Journal of Analytical and Applied Pyrolysis, 2009, 384-391, vol. 85, Dpto. Ingenieria Quimica y del Medio Ambiente, Escuela T.S. de Ingenieria, Bilbao, Spain.

I.D. Marco, et al, Recycling of Automobile Shredder Residues by Means of Pyrolysis, Journal of Analytical and Applied Pyrolysis, 2007, 403-408, vol. 79, Dpto. INgenieria Quimica y del Medio Ambientem Escuela Superior de Ingenieroes de Bilbao, Bilbao, Spain.

W. Kaminsky, et al, Recycling of Mixed Plastics by Pyrolysis in a Fluidised Bed, Macromolecular Symposium, 2000, 191-199, vol. 152, Institute of Technical and Macromolecular Chemistry, University of Hamburg, Hamburg, Germany.

F. A. Buzeto, et al, Recycling of Polyolefins by Pyrolysis in a Fluidized Bed Reactor, Department of Polymer Technology, College of Chemical Engineering.

G. Lopez, et al, Recycling poly-(methyl methacrylate) by Pyrolysis in a Conical Spouted Bed Reactor, Chemical Engineering and Processing: Process Intensification, 2010, 1089-1094, vol. 49, University of the Basque Country, Department of Chemical Engineering, Bilbao, Spain.

W. J. Hall, et al, Removal of Organobromine Compounds from the Pyrolysis Oils of Flame Retarded Plastics Using Zeolite Catalysts, Journal of Analytical and Applied Pyrolysis, 2008, 139-147, vol. 81, Energy and Resources Institute, University of Leeds, Leeds, United Kingdom.

W. Kaminsky, et al, Thermal Degradation of Mixed Plastic Waste to Aromatics and Gas, Polymer Degradation and Stability, 1996, 189-197, vol. 53, University of Hamburg, Institute for Technical and Macromolecular Chemistry, Hamburg, Germany.

W. Kaminsky, et al, Thermal Recycling of Polymers, Journal of Analytical and Applied Pyrolysis, 1985, 439-448, vol. 8, Hamburg, Germany.

Jose M. Arandes, et al, Thermal Recycling of Polystyrene and Polystyrene-Butadiene Dissolved in a Light Cycle Oil, Journal of Analytical and Applied Pyrolysis, 2003, 747-760, vol. 70, Bilbao, Spain.

P. G. Ward, et al, A Two Step Chemo-biotechnological Conversion of Polystyrene to a Biodegradable Thermoplastic, Environ. Sci. Technol., 2006, 2433-2437, vol. 40, Hamburg Germany.

W. Kaminsky, et al., Pyrolysis of plastics waste and old pneumatic tyres in a fluidization reactor, Materiaux Techn.,1978, pp. 146-153, vol. 66, No. 4.

W. Kaminsky, et al.,Raw Materials by Fluidized Bed Pyrolysis of Plastic Wastes and Other Hydrocarbon Containing Materials, Materials and Energy from Refuse, 1981, pp. 9.93-9.100.

W. Kaminsky, et al., Oil and Gas Recovery From Plastics and Sewage Sludge by Pyrolysis in a Fluidized Bed, American Chemical Society, Polymer Preprints, Division of Polymer Chemistry, 1983, p. 438, vol. 24, No. 2.

International Search Report in counterpart International Application No. PCT/IB2013/060826, May 27, 2014, pp. 1-4, received from International Searching Authority.

Written Opinion of the International Searching Authority for counterpart International App. No. PCT/IB2013/060826, May 27, 2014, pp. 1-5, received from International Searching Authority.

Manos et al., "Catalytic Degradation of High Density Polyethylene on an Ultrastable Y Zeolite, Nature of Initial Polymer Reactions, Patter of Formation of Gas and Liquid Products, and Temperature Effects.," Ind. Eng. Chem. Res., 2000, 39, 1203-1208.

Lappas et al., "Production of Reformulated Gasoline in the FCC Unit. Effect of Feedstock Type on Gasoline Composition," Catalysis Today (1999), 50, pp. 73-85.

* cited by examiner

CONVERSION OF PLASTICS TO OLEFIN AND AROMATIC PRODUCTS

TECHNICAL FIELD

The invention relates to the conversion of plastics to olefin and aromatics through pyrolysis.

BACKGROUND

Waste plastics are mostly diverted to landfills or are incinerated, with a smaller fraction being diverted to recycling. Over the years, with increased regulations and levies on landfills, the percentage of the post-consumer waste being recycled or incinerated for energy recovery is gradually increasing. The 2009 statistics by Plastics Europe indicate that approximately 24.4 million tons of waste plastics were generated in Europe. Of this, 54% was treated either through recycling (22.6%) or energy recovery (31.3%). Plastics diverted to landfills were approximately 46.1%. Thus, waste plastics disposal into landfills is becoming increasingly difficult.

Pyrolysis of waste plastics to products like naphtha, ethylene, propylene and aromatics can be classified under the category of feedstock recycling of waste plastics. With the naphtha prices increasing dramatically, steam crackers operating on naphtha feed are at a disadvantageous position compared to steam crackers operating on cheaper gaseous hydrocarbon feeds. If a portion of the naphtha feed to the steam crackers is replaced by an equivalent amount of products from plastics conversion processes, like pyrolysis, the economic situation for the steam crackers operating on naphtha feed will improve.

In order to make an impact on the economics of very large volumes in continuous steam cracker plant operations, it is necessary that the pyrolysis process is also continuous. No large scale plants exist today that directly convert waste plastics in a single step to petrochemicals. Previous attempts around the world have been focused on generation of liquid fuels from waste plastics. These plants were small in scale or modular in nature. Reactions carried out in such small scale plants are also carried out for longer residence times, making them less suitable for continuous operations on larger scales. Some earlier attempts have also focused at generating feedstocks for steam crackers from waste plastics. These rely on the availability of steam cracker furnaces for being successful, however. Furthermore, conversion of these produced steam cracker feeds in cracker furnaces would typically result in production of high amounts of methane, which is undesirable.

What is therefore needed is a process for the conversion of plastics directly to petrochemical products, such as olefins and aromatics, that minimize formation of methane, and that maximizes the yield of olefins and aromatics.

SUMMARY

A method of producing olefins and aromatic compounds from a feedstock is carried out by introducing a hydrocarbon feedstock and a catalyst composition within a reactor, with at least a portion of the reactor being at a reactor temperature of 550° C. or higher. The catalyst composition is a fluidized catalytic cracking (FCC) catalyst and a ZSM-5 zeolite catalyst, wherein the amount of ZSM-5 zeolite catalyst makes up from 10 wt. % or more of the total weight of the FCC catalyst and the ZSM-5 zeolite catalyst. The feedstock and catalyst composition are introduced into the reactor at a catalyst-to-feed ratio of from 6 or greater. At least a portion of the feedstock is allowed to be converted to at least one of olefins and aromatic compounds within the reactor. A product stream is removed containing said at least one of olefins and aromatic compounds from the reactor.

In certain specific embodiments the FCC catalyst is comprised of at least one of an X-type zeolite, a Y-type zeolite, a USY-zeolite, mordenite, faujasite, nano-crystalline zeolites, MCM mesoporous materials, SBA-15, a silico-alumino phosphate, a gallophosphate, and a titanophosphate.

The FCC catalyst may also comprised of at least one of a Y-zeolite and a USY-zeolite embedded in a matrix, with the FCC catalyst having a total surface area of from 100 m$^2$/g to 400 m$^2$/g, coke deposition in an amount of from 0 to 0.5% by weight.

In some applications the FCC catalyst is a non-fresh FCC catalyst having from greater than 0 to 0.5% by weight of coke deposition. In certain embodiments, the FCC catalyst may have a total surface area of from 100 m$^2$/g to 200 m$^2$/g.

In some embodiments, the amount of ZSM-5 zeolite catalyst of the catalyst composition makes up from 10 wt. % to 50 wt. % of the total weight of the FCC catalyst and the ZSM-5 zeolite catalyst. In other embodiments, the amount of ZSM-5 zeolite catalyst of the catalyst composition makes up from 30 wt. % to 45 wt. % of the total weight of the FCC catalyst and the ZSM-5 zeolite catalyst.

In certain instances, the reactor may be operated wherein said at least a portion of the reactor is at a reactor temperature of 570° C. to 730° C. The reactor may be at least one of a fluidized bed reactor, bubbling bed reactor, slurry reactor, rotating kiln reactor, and packed bed reactor in some embodiments.

In some applications, the feedstock and catalyst composition may be introduced into the reactor at a catalyst-to-feed ratio of from 8 or greater. The feedstock may be at least one of polyolefins, polyethylene, polypropylene, polystyrene, polyethylene terephthalate (PET), polyvinyl chloride (PVC), polyamide, polypolycarbonate, polyurethane, polyester, natural and synthetic rubber, tires, filled polymers, composites, plastic alloys, plastics dissolved in a solvent, biomass, bio oils, and petroleum oils.

In another aspect of the invention, a catalyst composition useful for producing olefins and aromatic compounds from a hydrocarbon feedstock is provided. The catalyst composition is comprised of a mixture of fluidized catalytic cracking (FCC) catalyst and a ZSM-5 zeolite catalyst, wherein the amount of ZSM-5 zeolite catalyst makes up from 10 wt. % to 50 wt. % of the total weight of the FCC catalyst and the ZSM-5 zeolite catalyst.

In certain more specific embodiments, the amount of ZSM-5 zeolite catalyst of the catalyst composition makes up from 30 wt. % to 45 wt. % of the total weight of the FCC catalyst and the ZSM-5 zeolite catalyst.

The FCC catalyst may be comprised of at least one of a Y-zeolite and a USY-zeolite embedded in a matrix in some applications, with the FCC catalyst having a total surface area of from 100 m$^2$/g to 400 m$^2$/g, coke deposition in an amount of from 0 to 0.5% by weight. In other applications, the FCC catalyst may be comprised of at least one of an X-type zeolite, a Y-type zeolite, a USY-zeolite, mordenite, faujasite, nano-crystalline zeolites, MCM mesoporous materials, SBA-15, a silico-alumino phosphate, a gallophosphate, and a titanophosphate.

The FCC catalyst may be a non-fresh FCC catalyst having from greater than 0 to 0.5% by weight of coke deposition. In some instances, the non-fresh FCC catalyst may have a total surface area of from 100 to 200 m$^2$/g.

In some embodiments, the FCC catalyst may be comprised of at least one of a Y-zeolite and a USY-zeolite embedded in a matrix, with the FCC catalyst having a total surface area of from 100 m$^2$/g to 400 m$^2$/g. In certain instances, such FCC catalyst may be a non-fresh catalyst having from greater than 0 to 0.5% by weight of coke deposition. Such FCC catalyst may further have a total surface area of from 100 m$^2$/g to 200 m$^2$/g in some embodiments.

In certain applications, the FCC catalyst is comprised of a of at least one of a Y-zeolite and a USY-zeolite, with said at least one of a Y-zeolite and a USY-zeolite and the ZSM-5 zeolite catalyst each being embedded in the same matrix.

BRIEF DESCRIPTION OF THE DRAWINGS

For a more complete understanding of the present invention, reference is now made to the following descriptions taken in conjunction with the accompanying figures, in which.

DETAILED DESCRIPTION

Figure 1:
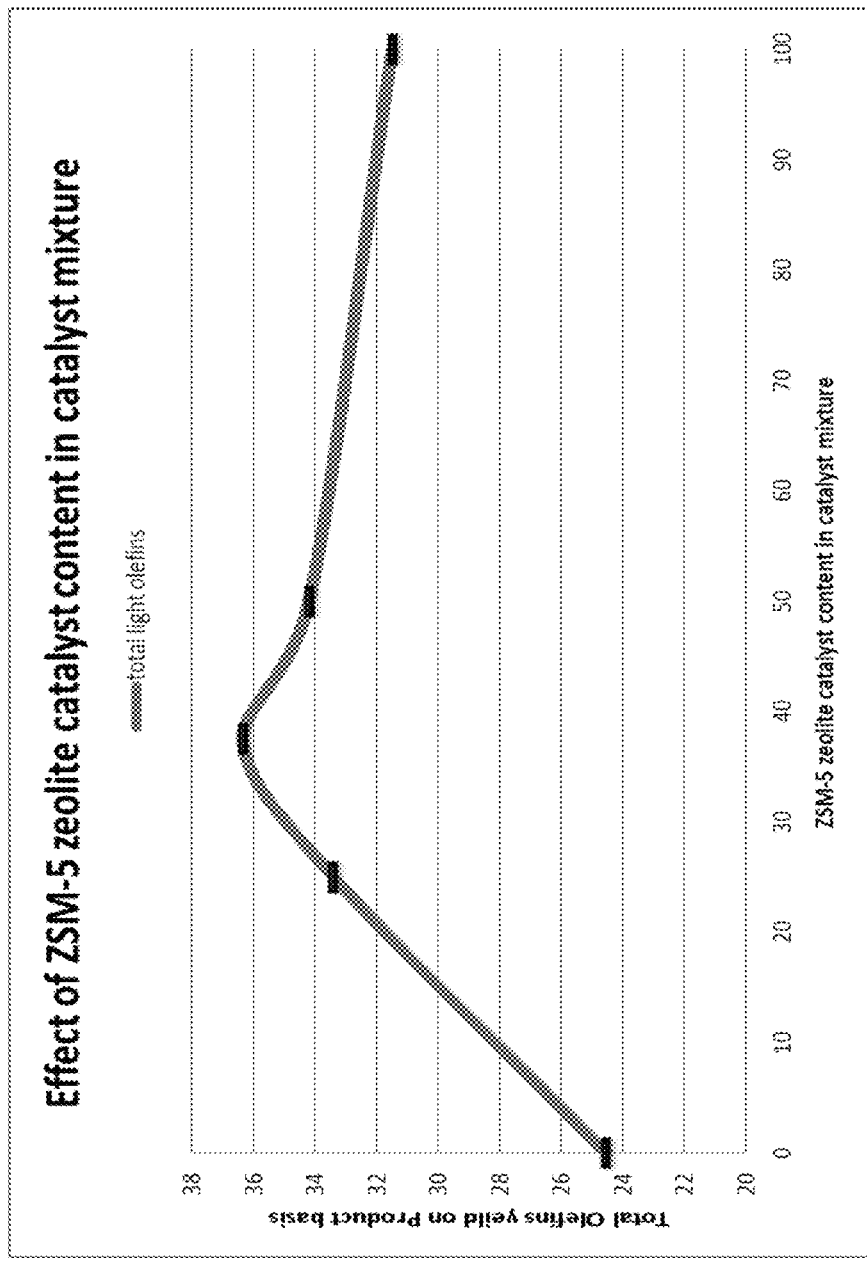
FIG. 1 is a plot of light gas olefin yields versus ZSM-5 zeolite catalyst content of catalyst compositions used in pyrolysis conversion of a plastic feedstock.

In the present invention, plastics and other hydrocarbons are converted through pyrolysis to monomers with high yields of light gas olefins (e.g., ethylene, propylene and butenes) and aromatics, with low yields of methane. The conversion can be accomplished with a low residence time (on the order of seconds) making it ideally suited for large scale commercial operations.

The process utilizes fluid catalytic cracking (FCC) catalysts and a ZSM-5 zeolite catalyst additive that are used in combination with one another in a catalyst composition to facilitate the pyrolytic conversion of the plastic or hydrocarbon feed. The FCC catalysts are those useful in the cracking of petroleum feeds. Such petroleum feeds may include vacuum gas oil (350-550° C. boiling range), atmospheric gas oil and diesel (220-370° C. boiling range), naphtha (<35° C. to 220° C. boiling range) or residues (boiling at >550° C. range) from a crude oil atmospheric and vacuum distillation units or the various such streams generated from all secondary processes in refineries including hydrotreating, hydrocracking, coking, visbreaking, solvent deasphalting, fluid catalytic cracking, naphtha reforming and such or their variants. The FCC catalysts are typically composed of large pore molecular sieves or zeolites. Large pore zeolites are those having an average pore size of from 7 Å or more, more typically from 7 Å to about 10 Å. Suitable large pore zeolites for FCC catalysts may include X-type and Y-type zeolites, mordenite and faujasite, nano-crystalline Zeolites, MCM mesoporous materials (MCM-41, MCM-48, MCM-50 and other mesoporous materials), SBA-15 and silico-alumino phosphates, gallophosphates, titanophosphates. Particularly useful are Y-type zeolites.

In Y-type zeolites used for FCC catalysts, the silica and alumina tetrahedral are connected by oxygen linkages. In order to impart thermal and hydrothermal stability, the Y-zeolite may be subjected to treatment to knock off some framework alumina (one of these routes is steaming at high temperature). Typically Y-zeolites have Si/Al ratio of about 2.5:1. The dealuminated Y-zeolite typically has a Si/Al ratio of 4:1 or more. The dealuminated Y-zeolite, with a higher framework Si/Al ratio, has stronger acid sites (isolated acid sites) and is thermally and hydrothermally more stable and is thus called ultrastable Y-zeolite (USY-zeolite). In units like fluid catalytic cracking where the catalysts see temperatures of 700° C. and also moisture in a catalyst regenerator, the thermal and hydrothermal stability is important so that catalyst activity is maintained over a longer period of time. Hence, in such types of operation USY-zeolite may be the preferred FCC catalyst.

The ultrastable zeolites may also be rare-earth-exchanged. The rare-earth content may be higher than 0% and may be as high as 10% by weight of the zeolite, with from 0.1-3% by weight of zeolite being typical. The higher the rare earth content, however, the more olefinicity of the products is lost by favoring hydrogen transfer reactions to make paraffins. Some amount of rare earth in the zeolite Y may be useful because it imparts stability to the zeolite. The rare earth materials may include cerium, lanthanum and other rare earth materials.

It should be understood that with respect to any concentration or amount range listed or described in the summary and detailed description as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

The FCC catalysts are typically the afore-mentioned zeolites embedded in an active matrix. The matrix may be formed from an active material, such as an active alumina material that could be amorphous or crystalline, a binder material, such as alumina or silica, and an inert filler, such as kaolin. The zeolite component embedded in the matrix of the FCC catalyst may make up from 10 to 90% by weight of the FCC catalyst. The FCC catalyst with the zeolite material embedded within the active matrix material may be formed by spray drying into microspheres. These catalysts are hard and have very good attrition resistance to withstand the particle-particle and particle-wall collisions that usually occur when the catalysts are fluidized. The particle size distribution for the FCC catalyst may range from greater than 0 to 150 microns. In certain embodiments, 90-95% of the particle size distribution may be within the range of from greater than 0 to 110 microns or 120 microns, with from 5-10% of the particles having particle sizes of greater than 110 microns. As a result of the distribution of particle sizes, the average or median particle size for the FCC catalyst is typically 70 to 75 microns. In certain instances, finer particles of the FCC catalyst may be used with larger particles to provide good fluidization. In certain embodiments, for example, 15% or less of the FCC catalyst may have a particle size of 40 microns or less. Good fluidization is imparted by presence of fines in a mix of fine and coarse particles. Loss of fine particles leads to de-fluidization.

The FCC catalysts may be further characterized based on certain physical, chemical, surface properties and catalytic activity. Fresh FCC catalysts have a very high surface area typically 300-400 $m^2/g$ or higher and a high activity. As a result of the high activity of the fresh FCC catalyst, cracking of petroleum feeds with the fresh FCC catalyst usually results in high yields of coke, such as 8-10 wt. %, and light gas. The very high yields of coke can affect the heat balance of the reaction as all the heat generated by coke formation may not be needed for cracking. Heat removal from a reactor-regenerator system thus may be necessary. This means that the feed is not effectively utilized. It would be more economically valuable if just enough coke required for supporting the cracking process heat requirements was made, with the balance that otherwise goes into excess coke formation being used to form useful products. Also, high yields of light gases (methane, ethane) from the fresh FCC catalyst are undesirable and may exceed the plant wet gas compressor equipment constraints or limits in an FCC complex. High yields of methane are undesirable because of its limited utility in forming chemicals (even though it is possible to form higher hydrocarbons from methane through syngas-methanol-olefins route). Ethane on the other hand may be used for making ethylene, a valuable chemical. In most cases, however, higher ethane yield is accompanied by a higher methane yield.

In order to overcome these problems, the FCC cracking unit is typically operated by maintaining a constant activity or conversion. This is done by having a circulating inventory of partially deactivated catalyst and then periodically purging a small portion of the used or non-fresh catalyst and making that up with fresh FCC catalyst. The use of used or non-fresh catalyst helps in maintaining the catalyst activity at a constant level without producing high levels of methane and coke. The circulating inventory of plant catalyst is partially deactivated or equilibrated under plant operating conditions. The portion of this catalyst that is purged out periodically is the spent catalyst. Thus in terms of catalyst activity it generally has the same activity of the circulating catalyst inventory in the FCC unit before make-up fresh catalyst is added. This catalyst make-up and purging is typically done on a regular basis in an operating FCC unit. The circulating catalyst inventory has roughly 50% or less of the surface area of the fresh catalyst and activity or conversion that is roughly 10 conversion units lower than that of fresh catalyst. In other words, if fresh catalyst were to provide a conversion of 80 wt. % of vacuum gas oil range material to dry gas ($H_2$—$C_2$), LPG ($C_3$-$C_4$), gasoline (35-220° C. boiling hydrocarbons) and coke, then the circulating partially deactivated catalyst inventory could provide a conversion of 70 wt. %. The FCC fresh catalyst particles added through make-up to the circulating unit would on an average spend several days (age) in the unit before it is purged out. Thus, due to the fact that daily make-up is made to the catalyst inventory, the circulating catalyst inventory would typically have catalyst particles of different ages, i.e., there is an age distribution of catalyst particles in the inventory. The catalyst activity of a particle is proportional to its deactivation in the FCC unit which in turn is also proportional to the age of the catalyst. The following Table 1 below lists typical properties between fresh and spent FCC catalysts.

TABLE 1

| Property | Fresh FCC Catalyst | Spent FCC Catalyst |
| --- | --- | --- |
| Total surface area, $m^2/g$ | 320-360 | 130-170 |
| Unit cell size, angstroms | 24.4-24.7 | 24.2-24.4 |
| Conversion of standard petroleum feed or activity, wt % | 78-85 | 67-73 |
| Ni + V, ppm | 0 | Typically 500-3000 |
| Coke on the catalyst, wt % | 0 | 0-0.5 typically |
| Sulfur oxide (Sox) reduction and/or Sulfur reduction additives present? | No | Yes* |

*Sox and S reduction additives are usually from 10-15 wt. %. Sox and S reduction additives would not have catalyst activity for cracking and thus would dilute the catalyst activity. These additives are usually added to meet automotive fuel specification requirements for streams generated from the FCC unit and for mitigating Sox liberation to environment. Usually oxides of magnesium are used in such additives and they would be having lower or no conversion for breaking molecules and would thus reduce the ability of the FCC catalyst to convert heavier molecules to lighter molecules i.e. activity dilution.

The present invention can make use of either fresh FCC catalyst, non-fresh FCC catalyst, or a mixture of both. This may include spent FCC catalyst that is removed from the fluidized catalytic cracking process, as described previously. Because spent FCC catalyst is typically a waste product from the fluidized catalytic cracking process, its use in the conversion of plastics and other hydrocarbons to useful products is particularly advantageous. This is due to both its lower cost and availability and due to its favorable activity in not forming more coke and methane. The spent FCC catalyst is essentially "used" or "non-fresh" FCC catalyst that has been used in the fluidized catalytic cracking process and has been removed for replacement with fresh catalyst, as previously described. As used herein, the expression "non-fresh" with respect to the FCC catalyst is meant to encompass any FCC catalyst, as they have been described, that has some amount (i.e. greater than 0%) of coke deposition. Fresh FCC catalyst would have no coke deposits. In some embodiments, the coke deposition on the non-fresh FCC catalyst may be from 0.01%, 0.05%, 0.1%, 0.2%, 0.3%, 0.4% or more by weight of the catalyst. Typically, the coke deposition for the non-fresh FCC catalyst will range from greater than 0 to 0.5% by weight of the catalyst. The spent FCC catalyst may have non-fresh catalyst particles with differing degrees of catalyst coking due to differences in the catalyst ages of use in the cracking process. The non-fresh FCC catalyst also has a reduced surface area compared to fresh FCC catalyst due to catalyst hydrothermal deactivation in the FCC unit. Typical surface area for the non-fresh catalyst may range from 100 $m^2/g$ to 200 $m^2/g$. Additionally, in some embodiments the FCC catalyst may include a combination of non-fresh or spent FCC catalyst and fresh FCC catalyst and may be used in the pyrolysis conversion reaction.

The ZSM-5 zeolite catalyst additive used in combination with the FCC catalyst is a molecular sieve that is a porous material containing intersecting two-dimensional pore structure with 10-membered oxygen rings. Zeolite materials with such 10-membered oxygen ring pore structures are often classified as medium-pore zeolites. Such medium-pore zeolites typically have pore diameters ranging from 5.0 Å to 7.0 Å. The ZSM-5 zeolite is a medium pore-size zeolite with a pore diameter of from about 5.1 to about 5.6 Å. The ZSM-5 zeolite and their preparation are described in U.S. Pat. No. 3,702,886, which is herein incorporated by reference. The ZSM-5 zeolite may be free from any metal loading.

The ZSM-5 zeolite is also typically embedded in an active matrix, which may be the same or similar to those used for the zeolite of the FCC catalyst, as previously described. The matrix may be formed from an active material, such as an active alumina material, a binder material, such as alumina or silica, and an inert filler, such as kaolin.

The zeolite component embedded in the matrix of the ZSM-5 catalyst may make up from 5 to 90% by weight of the ZSM-5 zeolite catalyst and more typically between 10 to 80% by weight of the ZSM-5 zeolite catalyst, and still more typically between 10 to 50% by weight of the ZSM-5 zeolite catalyst. The ZSM-5 zeolite catalyst with the ZSM-5 zeolite material embedded within the active matrix material may also be formed by spray drying into microspheres. The particle size distribution for the ZSM-5 zeolite catalyst may range from greater than 0 to 150 microns. In certain embodiments, 90-95% of the particle size distribution may be within the range of from greater than 0 to 110 microns or 120 microns. The average or median particle size for the ZSM-5 zeolite catalyst is typically 70 to 75 microns. In certain instances, finer particles of the ZSM-5 zeolite catalyst may be used with larger particles to provide good fluidization. In certain embodiments, for example, 15% or less of the ZSM-5 zeolite catalyst may have a particle size of 40 microns or less.

In certain embodiments, the zeolite material (e.g. X-type zeolite or Y-type zeolite) of the FCC catalyst and the ZSM-5 zeolite may be embedded and formed within the same matrix material unit so that catalyst particles containing both the FCC catalyst and ZSM-5 catalyst materials are formed. These particles may be of the same size and configuration as those previously described for the separate FCC catalyst and ZSM-5 zeolite catalyst. One of the advantages of combining the FCC and ZSM-5 zeolite component in a single matrix or particle is that it may result in a higher activity that can be obtained by minimizing the in-active diluents in the individual catalysts.

The catalysts selected for use in the plastic pyrolysis may have similar properties to FCC catalysts in terms of particle size distribution and attrition resistance, as these parameters may greatly influence the integrity of the catalyst recipe in an operating fluidized bed environment. Very fine particles can lead to their high losses due to their being entrained with product gases, while bigger catalyst particle sizes tend to not fluidize properly and result in non-uniform activity. In certain embodiments, however, pure forms of the FCC catalyst and the ZSM-5 zeolite without any matrix material or smaller particle sizes may be employed in systems where there is less probability of the catalyst being lost, such as in rotary kilns and slurry reactors.

In the present invention, plastic pyrolysis using the catalyst system produces valuable monomers of light gas olefins and aromatics, such as benzene, toluene and xylenes. The process yields are tunable to the desired yields of olefins and aromatics by using a combination of the catalyst system and process operating conditions. It has been found that with a combination of FCC catalysts and ZSM-5 zeolite catalyst additive, as has been described, higher yields of olefins and aromatics can be obtained as compared to using only an FCC catalyst. Specifically, a catalyst system containing from 10 wt. % or more of ZSM-5 zeolite catalyst of the total weight of the FCC catalyst and the ZSM-5 zeolite catalyst provides increased yields of olefins and aromatics. As used herein, weight percentages of the ZSM-5 zeolite catalysts and FCC catalysts are based upon the total weight of the catalyst, including any matrix material, unless expressly stated otherwise. Where no matrix material is employed in the reactions the weight percentages of the ZSM-5 zeolite catalysts and FCC catalysts are the weight percentage of the zeolites only.

In certain embodiments, the amount of ZSM-5 zeolite catalyst of the catalyst composition makes up from 10 wt. % to 50 wt. % of the total weight of the FCC catalyst and the ZSM-5 zeolite catalyst. Thus, the amount of ZSM-5 zeolite catalyst of the catalyst composition makes up from 10 wt. %, 15% wt. %, 20% wt. %, 25% wt. %, 30% wt. %, or 35% wt. % to 40% wt. %, 45% wt. %, or 50 wt. % of the total weight of the FCC catalyst and the ZSM-5 zeolite catalyst. In still other embodiments, the amount of ZSM-5 zeolite catalyst of the catalyst composition makes up from 30 wt. % to 45 wt. % of the total weight of the FCC catalyst and the ZSM-5 zeolite catalyst. In further embodiments, the amount of ZSM-5 zeolite catalyst of the catalyst composition makes up from 35 wt. % to 40 wt. % of the total weight of the FCC catalyst and the ZSM-5 zeolite catalyst. In particular instances, it has been found that the highest yields of olefins and aromatics are produced when the ZSM-5 zeolite catalyst is used in an amount of approximately 37.5 wt. % by total weight of the FCC catalyst and the ZSM-5 zeolite catalyst.

The plastic feed used in the conversion reaction may include essentially all plastic materials, such as those formed from organic polymers. Non-limiting examples include polyolefins, such as polyethylene, polypropylene, etc., polystyrene, polyethylene terephthalate (PET), polyvinyl chloride (PVC), polyamide, polycarbonate, polyurethane, polyester, natural and synthetic rubber, tires, filled polymers, composites and plastic alloys, plastics dissolved in a solvent, etc. While plastic feeds may be used in the conversion reaction, other hydrocarbon materials may also be used as the feedstock. These hydrocarbons may include biomass, bio oils, petroleum oils, etc. Thus, while the present description is directed primarily to the conversion of plastic feeds, it should be understood that the invention has applicability to and encompasses the use of other hydrocarbons as well. When production of light gas olefins is desired, a plastic feed of polyolefins or that is primarily or contains a substantial portion of polyolefins may be preferred. Mixtures of various different plastic and hydrocarbon materials may be used without limitation.

The plastic feed may be provided in a variety of different forms. In smaller scale operations, the plastic feed may be in the form of a powder. In larger scale operations, the plastic feed may be in the form of pellets, such as those with a particle size of from 1 to 5 mm.

The catalyst and plastic feed may be mixed together prior to introduction into the reactor or may be fed separately. The amount or ratio of catalyst used to plastic feed may vary and may be dependent upon the particular system used and process conditions. Plastics can be converted using a very low or very high catalyst-to-feed (C/F) ratio. Longer contact times may be needed in the case of a low C/F ratio, while shorter contact times may be need for a high C/F ratio. In testing, C/F ratios of from 4 to 12 were used, with C/F ratios of from 6 to 9 being most frequently used. In large scale industrial process wherein a circulating fluidized bed riser or downer may be used, the C/F ratio may be determined by the reactor heat balance or other parameters.

Various reactors may be used for the conversion process. For large scale operations, a circulating fluidized bed riser or downer reactor may be used. A bubbling bed reactor where the catalyst is bubbled in-situ, with the feed being added to the bubbling bed may also be used. Slurry-type reactors and rotating kiln-type reactors may also be used in some applications.

The catalyst composition composed of the FCC catalyst and ZSM-5 zeolite catalyst and the plastic feed are introduced (mixed or added separately) into a reactor, such as a fluidized bed reactor, as previously described. The reactor is operated at a reactor temperature wherein all or a portion of the reactor is at a temperature of 550° C. or higher. In some embodiments, the reactor is operated at a reactor temperature wherein all or a portion of the reactor is at a temperature of 570° C. or higher. In certain embodiments, the reactor is operated at a reactor temperature wherein all or a portion of the reactor is at a temperature of from 550° C. to 730° C., more particularly from 570° C. to 680° C., 690° C. or 700° C. Reactor pressures may range from ambient to 50 bar (g) (5 MPa) and more typically from ambient to 3 bar (g) (0.3 MPa). Nitrogen, dry gas ($H_2$—$C_2$), steam or other inert gases or mixture of gases may be used as a carrier gas in which the catalyst and feed are entrained. A range of fluidization gas flow rates can be employed in different modes, such as bubbling fluidized bed mode, circulating fluidized bed mode, slurry tank reactor mode. Other reactor configurations and modes may also be used. In particular embodiments, a circulating fluidized mode may be used because it offers advantages on coke management, better heat transfer and contacting between feed and catalysts. The catalyst/feed ratio (C/F) can range from as low as 2 and as high as 30 and more typically in the range of 4-12.

The pyrolysis conversion of plastics to light gas olefins and aromatics may take place fairly rapidly, i.e. within a few seconds. The pyrolysis products produced include light gas olefins, such as ethylene, propylene, butenes, etc., and aromatics, such as benzene, toluene, xylenes, and ethyl benzene. These may be selectively produced in large quantities. Complete conversion of the feed plastics to various products occurs. Products produced include gases ($H_2$—$C_4$), gasoline or naphtha (boiling point 35-220° C.), diesel (boiling point 220-370° C.), a small fraction of heavier stream (boiling point >370° C.) and coke. The yield of various products could be varied by using different catalyst recipe or any or all of the above mentioned parameters including contact time, fluidization flow rate and specific features of the reactor hardware, such as diameter, length or feed and/or gas distribution design or mixing/contacting related hardware modifications, recycles of products into the reactor for further conversion and such other parameters. Saturated products, such as methane, ethane, propane, and butanes, are also produced, as well as hydrogen gas ($H_2$). In testing, low yields of methane and butadiene were obtained (<2 wt. % and 0.5 wt. %, respectively). This indicates that even though the temperature severity employed is high (i.e. 550° C. or higher), the observed activity is predominantly probably due to catalytic activity than thermal cracking. The catalyst composition can be used under conditions that successfully suppress methane formation and at the same time offer high conversions and minimize heavy products. The process also minimizes the formation of heavy liquid products, i.e., those product heavy ends boiling above 370° C.

The pyrolysis products produced can be used in a variety of processes. For example the light gas olefins formed (ethylene, propylene and butenes) can be used in polymerization, the aromatics can be used as building blocks for derivatives or can be used as such in specific applications, the saturated gases can be cracked further to light gas olefins or can be directed to fuel gas ($H_2$—$C_2$) and LPG ($C_3$-$C_4$) pool or can be used as a fuel in the pyrolysis or any other process. The coke formed can be used as an energy source for supplying the necessary heat requirements for the pyrolysis process.

The following examples serve to further illustrate the invention.

EXAMPLES

Experimental

In each of the examples presented below, an in-situ fluidized bed lab tubular reactor having a length of 783 mm and an inner diameter of 15 mm was used. The reactor was housed in a split-zone 3-zone tubular furnace with independent temperature control for each zone. The size of each zone was 9.3 inches (236.2 mm). The overall heated length of the reactor placed inside the furnace was 591 mm. The reactor wall temperature was measured at the centre of each zone and was used to control the heating of each furnace zone. The reactor had a conical bottom and the reactor bed temperature was measured using a thermocouple housed inside a thermowell and placed inside the reactor at the top of the conical bottom. Also, the reactor wall temperature was measured at the conical bottom to ensure that the bottom of the reactor was hot. The reactor bottom was placed at the middle of the furnace bottom zone for minimizing the effect of furnace end cap heat losses and maintaining the reactor bottom wall temperature within a difference of 20° C. of the internal bed temperature measured.

The plastic feeds were in the form of a 200 micron plastic powder. The FCC catalyst was a spent FCC catalyst obtained from an operating refinery. The FCC spent catalyst used had a residual coke on it of 0.23 wt %. The ZSM-5 zeolite catalyst used was a commercially available ZSM-5 zeolite catalyst. The plastic feed was mixed with catalyst by swirling in a cup and then fed into the reactor.

The conversion products from the reactor were collected and condensed in a condenser. The uncondensed products were collected in a gas collection vessel and the gas composition was analyzed using a refinery gas analyzer (M/s AC Analyticals B.V., The Netherlands). Liquid products were characterized for their boiling point distribution using a simulated distillation GC (M/s AC Analyticals B.V., The Netherlands). In addition a detailed hydrocarbon analysis (up to $C_{1-3}$ hydrocarbons) was carried out using a DHA analyzer (M/s AC Analyticals B.V., The Netherlands). The coke deposited on the catalyst was determined using an IR-based CO and $CO_2$ analyzer. The mass balances were determined by summing the yields of gas, liquid and coke. Individual product yields were determined and reported on a normalized product basis.

Example 1

Tests were conducted using a pure HDPE plastic feed ground to 200 microns size and a catalyst composition of 75 wt. % FCC spent catalyst and 25 wt. % of ZSM5 zeolite catalyst. The plastic feed used was 0.75 g and the dry catalyst weight used was 4.5 g. This correlates to a C/F ratio of 5.98 (~6.0). The feed and the catalyst were fed to the reactor as described above. Before charging of the feed, the bed temperature as measured by the reactor internal thermocouple was 650° C. A flow of $N_2$ gas at 200 Ncc/min (normal cc/min) was used as a fluidizing and carrier gas. The results are presented in Table 2 below.

TABLE 2

| C/F ratio | 6.0 |
|---|---|
| Reaction temperature at start | 650.0 |
| Methane | 1.24 |
| % H2, C1, C4 yield | 54.1 |
| % Liquid yield | 44.2 |
| % Coke yield | 1.7 |
| C4=, wt % | 16.3 |
| C3=, wt % | 19.8 |
| C2=, wt % | 6.3 |
| Total olefins | 42.4 |

This example shows that with pure polyolefinic feed, high gas yield is possible at high temperature severity without producing high yields of methane.

Experimental for Examples 2-13

For Examples 2-13, a mixed plastic feed formed from a mixture of polyolefins, polystyrene (PS) and PET was used having the following composition set forth in Table 3 below. The mixed plastic was used in the form of powder and was fed to the reactor along with catalyst as described earlier. Reactor temperatures at the start of reaction are those measured inside the reactor before feed and catalyst are charged. Fluidization $N_2$ gas flow was 175 Ncc/min.

TABLE 3

| Material | Amount |
|---|---|
| HDPE | 19 wt. % |
| LDPE | 21 wt. % |
| PP | 24 wt. % |
| C4-LLDPE | 12 wt. % |
| C6-LLDPE | 6 wt. % |
| PS | 11 wt. % |
| PET | 7 wt. % |

Example 2

Spent FCC catalyst was used with varying amounts of ZSM-5 zeolite catalyst from 0 to 100 percent. The testing was conducted at a reactor temperature of 670° C. set before the start of reaction. A C/F ratio of 9 was used. The experiments were carried out with 6.8 g of dry catalyst and 0.75 g of plastic feed. The total light gas olefins (i.e., $C_2$ to $C_4$) were measured. The results are presented in FIG. 1 and Table 4. As can be seen from FIG. 1, the highest yields of light gas olefins was achieved when the amount of ZSM-5 zeolite catalyst additive in the catalyst mixture was at around 37.5 wt. %.

TABLE 4

| ZSM-5 zeolite catalyst content in catalyst mixture | Wt. % | 0 | 25 | 37.5 | 50 | 100 |
|---|---|---|---|---|---|---|
| C/F ratio | g/g | 9.1 | 9 | 9 | 9 | 8.9 |
| Reaction temperature at start | ° C. | 670 | 670 | 670 | 670 | 670 |
| Dry catalyst fed | g | 6.8 | 6.77 | 6.76 | 6.75 | 6.7 |
| Feed weight transferred | g | 0.75 | 0.75 | 0.75 | 0.75 | 0.75 |
| Total light gas olefins ($C_2 + C_3 + C_4$) yield | Wt. % | 24.5 | 33.4 | 36.4 | 34.2 | 31.5 |

Example 3

Figure 2:
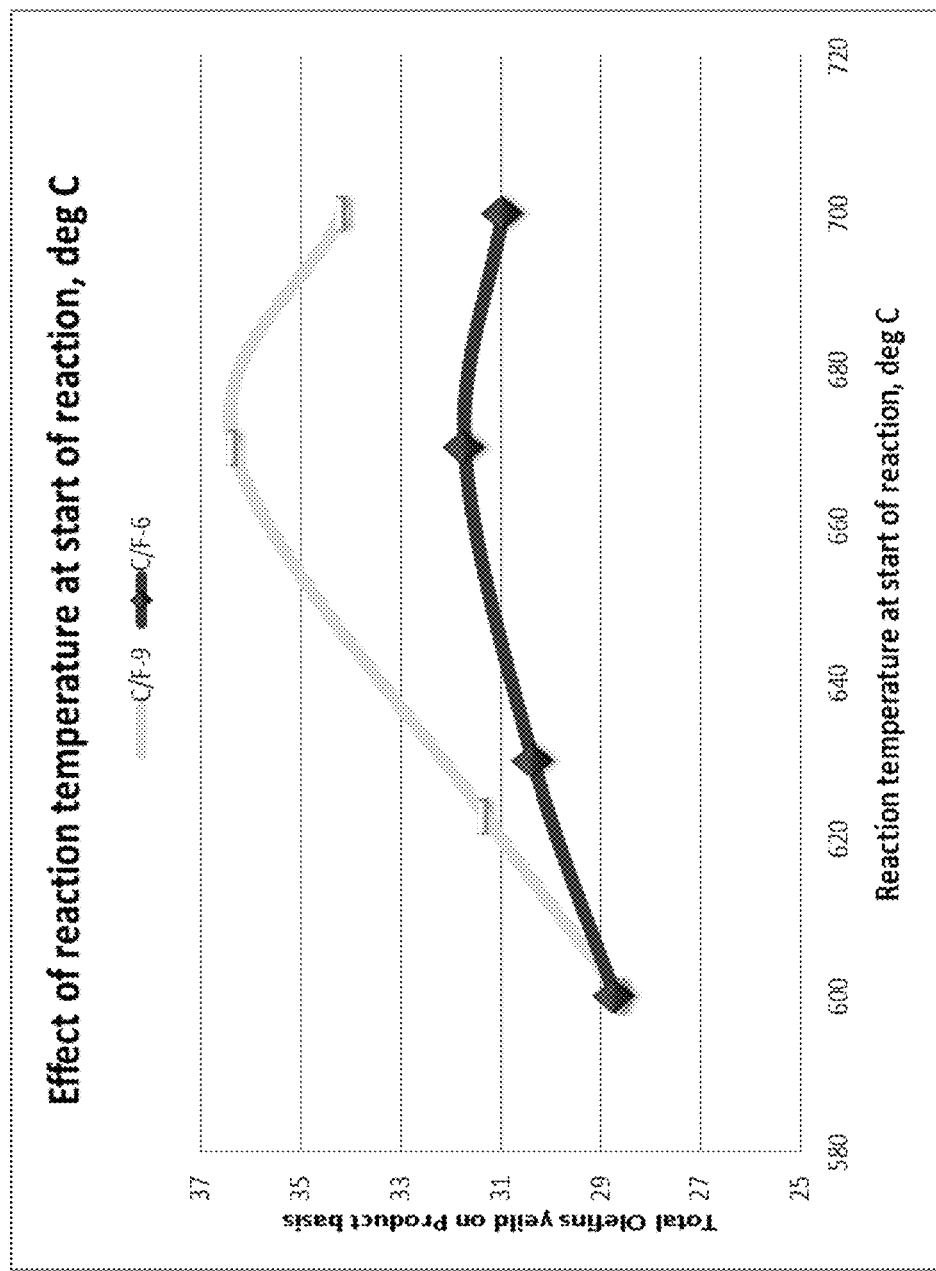
FIG. 2 is a plot of light gas olefin yields versus reactor temperatures in pyrolysis conversion of a plastic feedstock using a catalyst composition of the invention.

Tests to determine the effect of different reactor temperatures at the start of the reaction and different C/F ratios of 6 and 9 on the production of light gas olefin yields were conducted. These experiments were carried out by employing a catalyst mixture containing 62.5 wt. % of spent FCC catalyst and 37.5 wt. % of ZSM-5 zeolite catalyst at a C/F ratio of 9 and 75 wt. % of spent FCC catalyst and 25 wt. % of ZSM-5 zeolite catalyst at a C/F ratio of 6. When the feed and catalyst was charged, the reactor temperature fell rapidly and reached a minimum value and then climbed back to its original values before the start of reaction. Most of the temperature regain occurred within one minute after charging of reactor. The results are presented in FIG. 2 and Tables 5 and 6. As can be seen from FIG. 2, the light gas olefin yields increased with temperature and reached a maximum value at or around 670° C. With a higher C/F ratio of 9 (Table 5), the olefin yield increased compared to the lower C/F ratio (Table 6).

TABLE 5

| Catalyst composition | Wt. % | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) |
|---|---|---|---|---|---|
| C/F ratio | g/g | 9.0 | 7.0 | 9.0 | 9.95 |
| Reaction temperature at start | ° C. | 600 | 623 | 670 | 700 |
| Dry catalyst fed | g | 6.76 | 5.22 | 6.76 | 7.46 |
| Feed weight transferred | g | 0.75 | 0.75 | 0.75 | 0.75 |
| Total light gas olefins yield ($C_2 + C_3 + C_4$) | Wt. % | 28.58 | 31.32 | 36.35 | 34.16 |

TABLE 6

| Catalyst composition | Wt. % | Spent FCC (75%) + ZSM-5 zeolite catalyst (25%) | Spent FCC (77.3%) + ZSM-5 zeolite catalyst (22.7%) | Spent FCC (75%) + ZSM-5 zeolite catalyst (25%) | Spent FCC (75%) + ZSM-5 zeolite catalyst (25%) |
|---|---|---|---|---|---|
| C/F ratio | g/g | 6.0 | 6.0 | 6.0 | 6.0 |
| Reaction temperature at start | ° C. | 600 | 630 | 670 | 700 |
| Dry catalyst fed | g | 4.49 | 2.99 | 4.49 | 2.99 |
| Feed weight transferred | g | 0.75 | 0.5 | 0.75 | 0.5 |
| Total light gas olefins yield ($C_2 + C_3 + C_4$) | Wt. % | 28.73 | 30.36 | 31.73 | 30.96 |

Example 4

Figure 3:
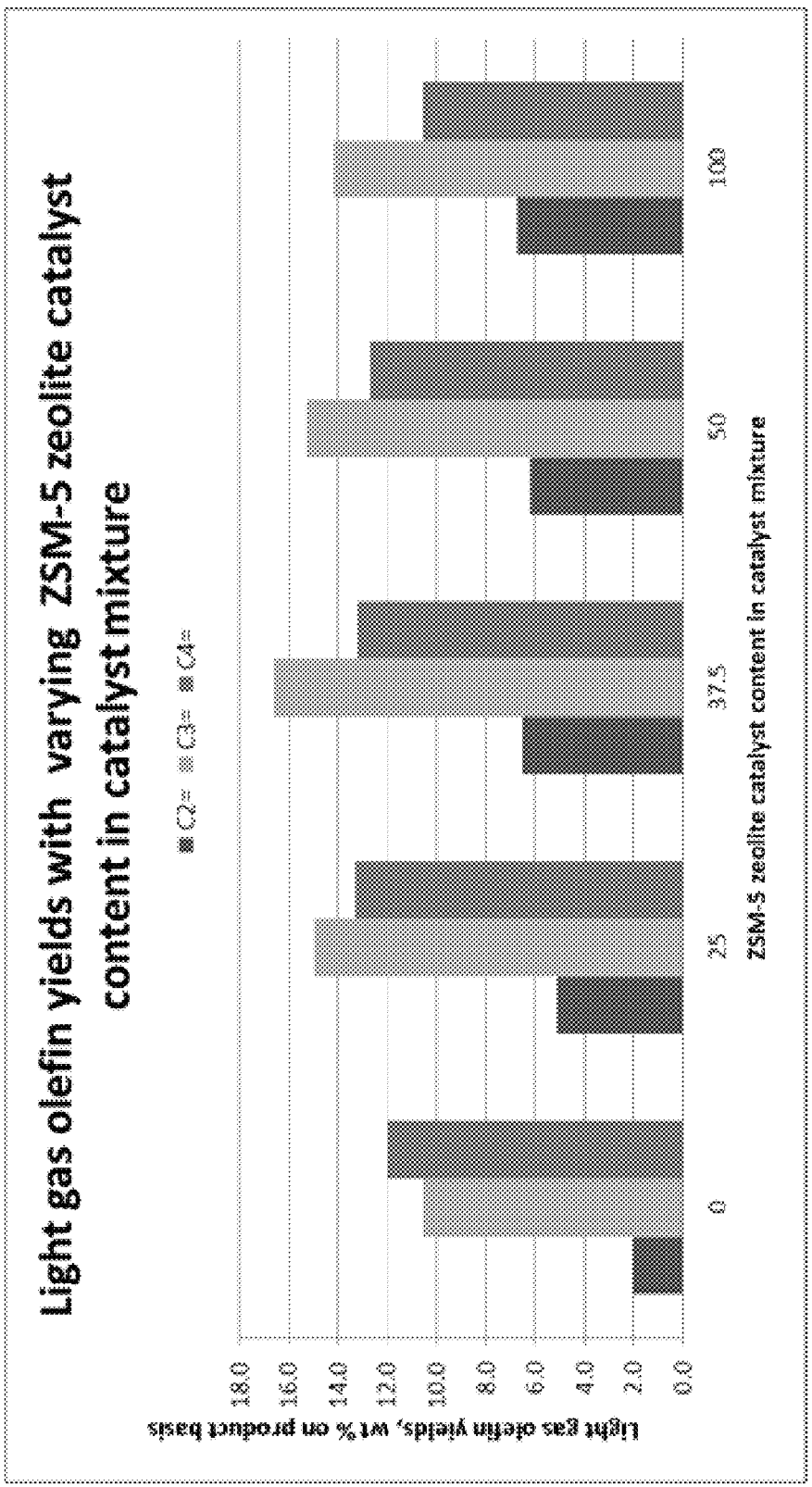
FIG. 3 is a plot of different light gas olefin yields versus ZSM-5 zeolite catalyst content of catalyst compositions used in pyrolysis conversion of a plastic feedstock.

Tests to determine the yields of different olefins as a function of catalyst composition of spent FCC catalyst with varying amounts of ZSM-5 zeolite catalyst (i.e., 0 to 100%) were conducted. The reaction was carried out at a temperature of 670° C. at the start of reaction and a C/F ratio of 9. The results are presented in FIG. 3 and Table 7. As can be seen in FIG. 3, propylene yields were highest at a ZSM-5 zeolite catalyst content of about 37.5 wt. %.

TABLE 7

| ZSM-5 zeolite catalyst content in the catalyst mixture | Wt. % | 0 | 25 | 37.5 | 50 | 100 |
|---|---|---|---|---|---|---|
| C/F ratio | g/g | 9.07 | 9.0 | 9.0 | 9.0 | 8.92 |
| Reaction temperature at start | ° C. | 670 | 670 | 670 | 670 | 670 |
| Dry catalyst fed | g | 6.80 | 6.77 | 6.76 | 6.75 | 6.70 |
| Feed weight transferred | g | 0.75 | 0.75 | 0.75 | 0.75 | 0.75 |
| $C_4$ Yield = | Wt. % | 11.99 | 13.32 | 13.21 | 12.69 | 10.58 |
| $C_3$ Yield = | Wt. % | 10.57 | 14.96 | 16.62 | 15.28 | 14.21 |
| $C_2$ Yield = | Wt. % | 1.98 | 5.11 | 6.52 | 6.22 | 6.71 |
| Total light gas olefins yield | Wt % | 24.5 | 33.4 | 36.4 | 34.2 | 31.5 |

Example 5

Figure 4:
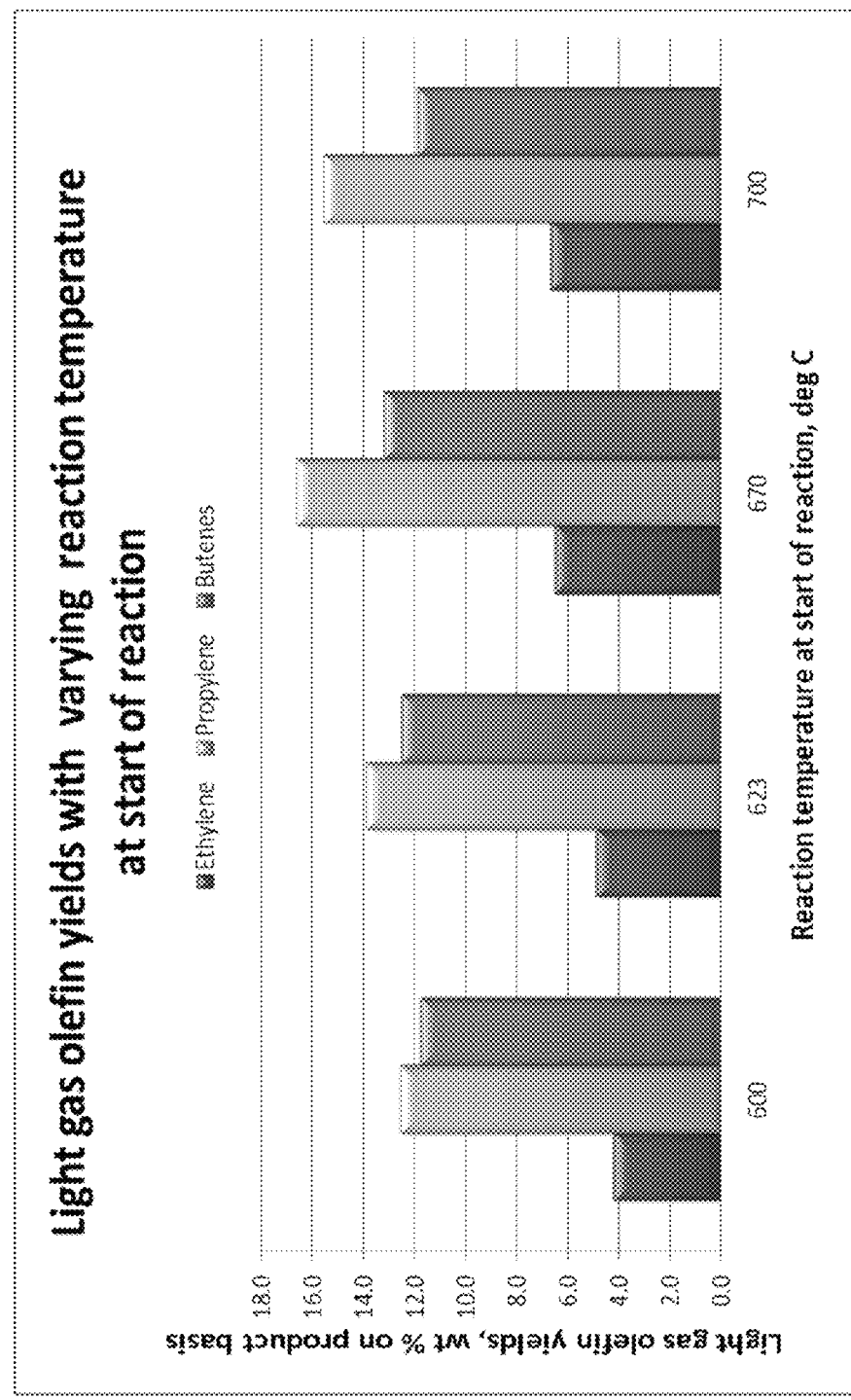
FIG. 4 is a plot of different light gas olefin yields versus reactor temperatures in pyrolysis conversion of a plastic feedstock using a catalyst composition of the invention.

Tests to determine the effect of starting temperatures of the yields of different olefins were conducted. The amount of ZSM-5 zeolite catalyst was at 37.5 wt. % of the catalyst mixture. The C/F ratios used are provided in Table 8. The results are presented in FIG. 4 and Table 8. As can be seen in FIG. 4, the highest yields were obtained at a temperature of around 670° C.

TABLE 8

| Catalyst composition | Wt. % | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) |
|---|---|---|---|---|---|
| C/F ratio | g/g | 9.0 | 7.0 | 9.0 | 9.95 |
| Reaction temperature at start | ° C. | 600 | 623 | 670 | 700 |
| Dry catalyst fed | g | 6.76 | 5.22 | 6.76 | 7.46 |
| Feed weight transferred | g | 0.75 | 0.75 | 0.75 | 0.75 |
| $C_4$ Yield = | Wt. % | 11.77 | 12.54 | 13.21 | 11.89 |
| $C_3$ Yield = | Wt. % | 12.59 | 13.90 | 16.62 | 15.61 |
| $C_2$ Yield = | Wt. % | 4.22 | 4.89 | 6.52 | 6.66 |

Example 6

Figure 5:
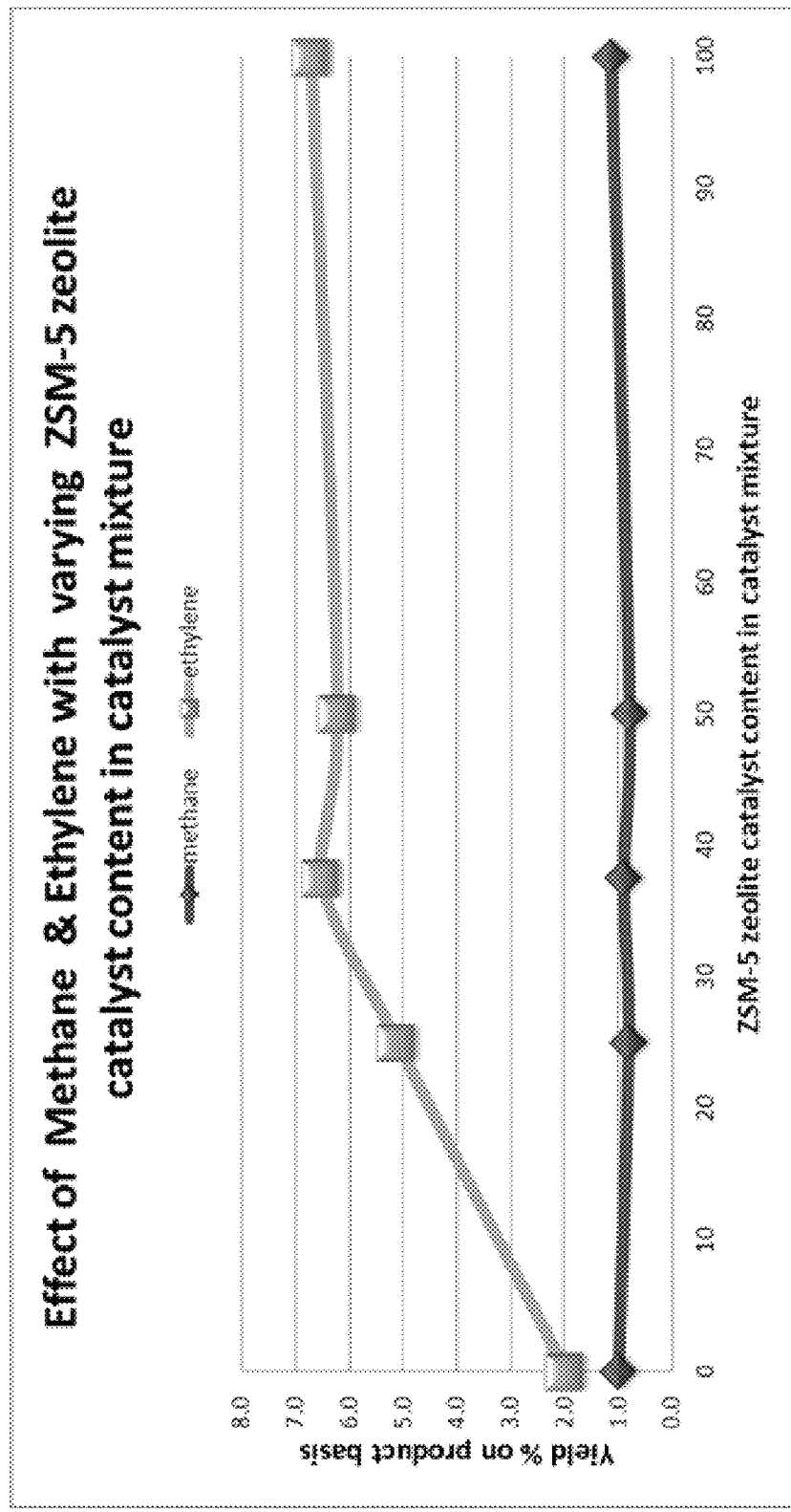
FIG. 5 is a plot of methane and ethylene yields versus ZSM-5 zeolite catalyst content of catalyst compositions used in pyrolysis conversion of a plastic feedstock.

Tests were conducted at an initial reaction temperature of 670° C. with varying amounts of ZSM-5 zeolite catalyst from 0% to 100% in the catalyst composition. A C/F ratio of 9 was used. Ethylene and methane yields were then measured, with the results being presented in FIG. 5 and Table 9. As can be seen in FIG. 5 and from Table 9, methane yields did not vary significantly over the range of ZSM-5 zeolite catalyst content for the catalyst system. In comparison, the ethylene yields increased significantly from 2 wt. % to 7 wt. %, indicating that methane yields are being suppressed under the operating conditions and the catalyst composition employed.

TABLE 9

| ZSM-5 zeolite catalyst content in the catalyst mixture | Wt. % | 0 | 25 | 37.5 | 50 | 100 |
|---|---|---|---|---|---|---|
| C/F ratio | g/g | 9.07 | 9.0 | 9.0 | 9.0 | 8.92 |
| Reaction temperature at start | ° C. | 670 | 670 | 670 | 670 | 670 |
| Dry catalyst fed | g | 6.80 | 6.77 | 6.76 | 6.75 | 6.70 |
| Feed weight transferred | g | 0.75 | 0.75 | 0.75 | 0.75 | 0.75 |
| Methane | Wt. % | 1.00 | 0.81 | 0.90 | 0.79 | 1.13 |
| Ethylene | Wt. % | 1.98 | 5.11 | 6.52 | 6.22 | 6.71 |

Example 7

Figure 6:
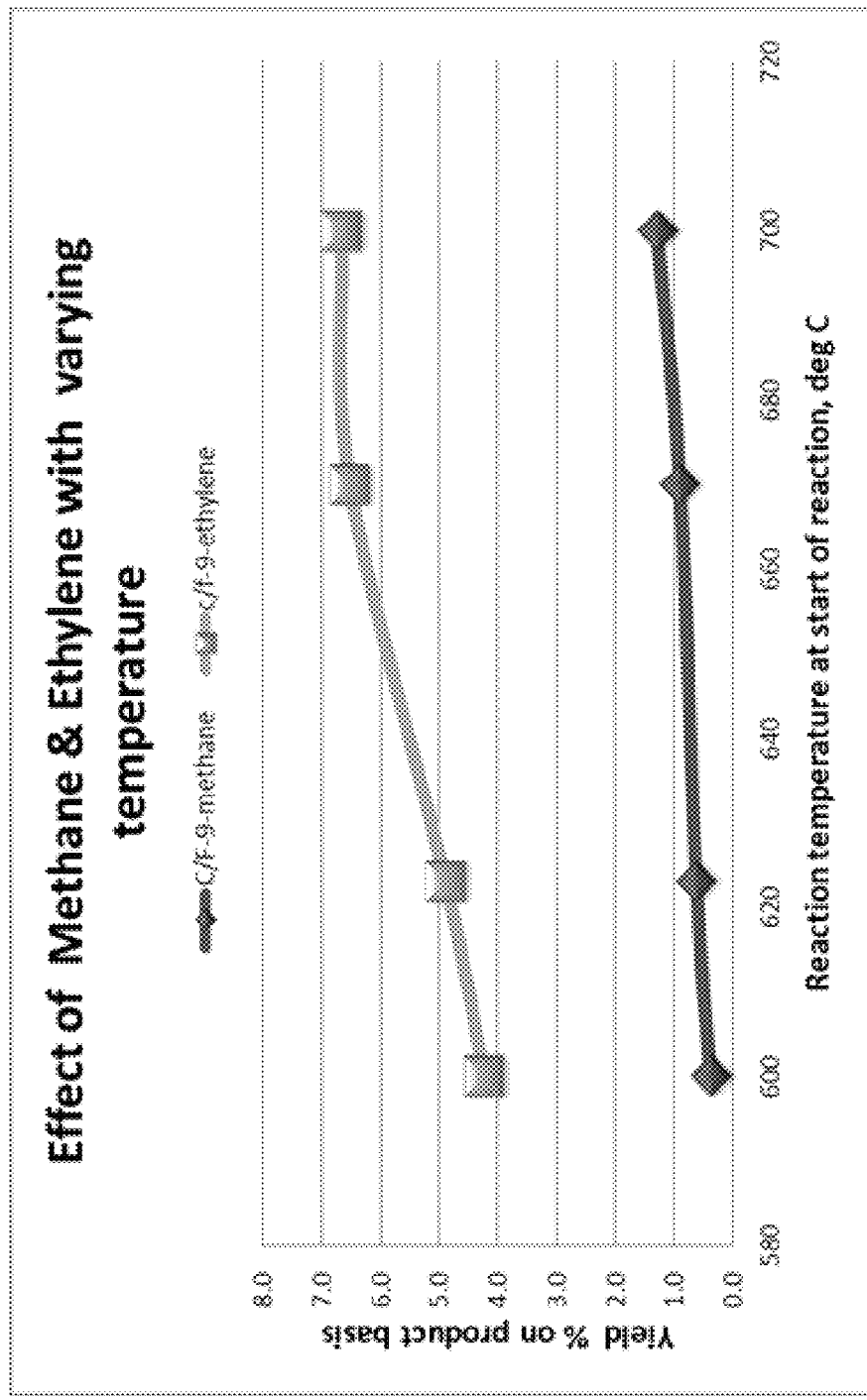
FIG. 6 is a plot of methane and ethylene yields versus reactor temperatures in pyrolysis conversion of a plastic feedstock using a catalyst composition of the invention.

Tests to determine the effect of starting temperatures on the yields of methane and ethylene were conducted. The catalyst composition was 62.5% wt. % FCC catalyst and 37.5 wt. % ZSM-5 zeolite catalyst, using a C/F feed ratio of 9. The results are presented in FIG. 6 and Table 10. As can be seen in FIG. 6, over the range of temperatures, the methane yields varied from 0.4 wt. % to 1.3 wt. %, while ethylene yields varied from 4.2 wt. % to 6.7 wt. %. Again, the yields of methane were low, showing that the combination of catalyst composition and process conditions can suppress methane yields and increase ethylene production.

TABLE 10

| Catalyst composition | Wt. % | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) |
|---|---|---|---|---|---|
| C/F ratio | g/g | 9.0 | 7.0 | 9.0 | 9.95 |
| Reaction temperature at start | ° C. | 600 | 623 | 670 | 700 |
| Dry catalyst fed | g | 6.76 | 5.22 | 6.76 | 7.46 |
| Feed weight transferred | g | 0.75 | 0.75 | 0.75 | 0.75 |
| Methane | Wt. % | 0.38 | 0.62 | 0.90 | 1.29 |
| Ethylene | Wt. % | 4.22 | 4.89 | 6.52 | 6.66 |

Example 8

Figure 7:
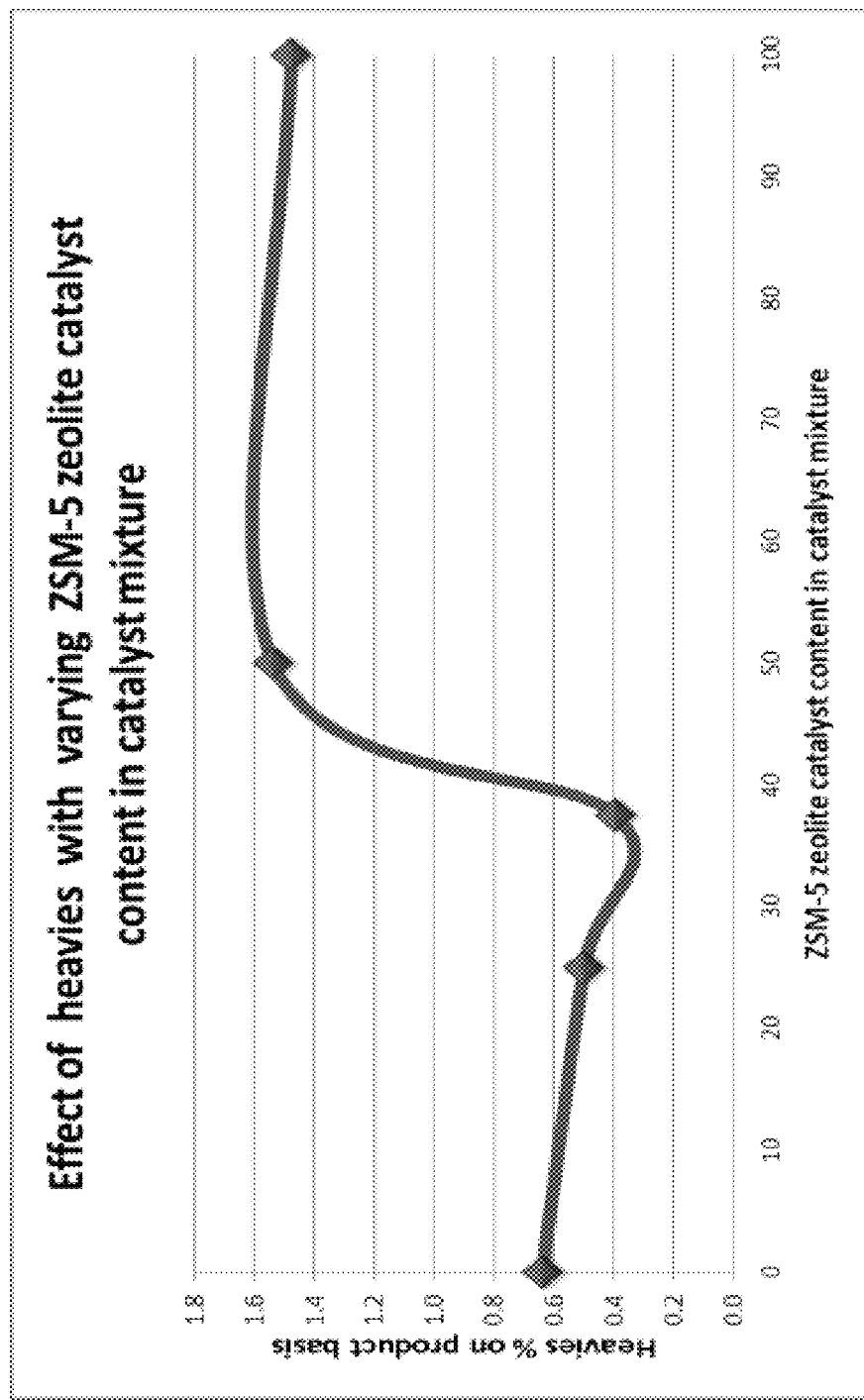
FIG. 7 is a plot of heavy liquid product yields versus ZSM-5 zeolite catalyst content of catalyst compositions used in pyrolysis conversion of a plastic feedstock.

Tests to determine the yields of heavy liquid product (i.e., liquid product with a boiling point above 370° C.) as a function of catalyst composition of spent FCC catalyst with varying amounts of ZSM-5 zeolite catalyst (i.e., 0 to 100%) were conducted. The reaction was carried out at a temperature of 670° C. and a C/F ratio of 9. The results are presented in FIG. 7 and Table 11. As can be seen in FIG. 7, above a ZSM-5 zeolite catalyst content of 50 wt. % the catalyst activity for producing heavy liquid products is not optimal. The catalyst activity gets diluted with higher amounts of ZSM-5 zeolite catalyst above this range.

TABLE 11

| ZSM-5 zeolite catalyst content in the catalyst mixture | Wt. % | 0 | 25 | 37.5 | 50 | 100 |
|---|---|---|---|---|---|---|
| C/F ratio | g/g | 9.07 | 9.0 | 9.0 | 9.0 | 8.92 |
| Reaction temperature at start | ° C. | 670 | 670 | 670 | 670 | 670 |
| Dry catalyst fed | g | 6.80 | 6.77 | 6.76 | 6.75 | 6.70 |
| Feed weight transferred | g | 0.75 | 0.75 | 0.75 | 0.75 | 0.75 |
| Heavies | Wt. % | 0.64 | 0.50 | 0.39 | 1.54 | 1.48 |

Example 9

Figure 8:
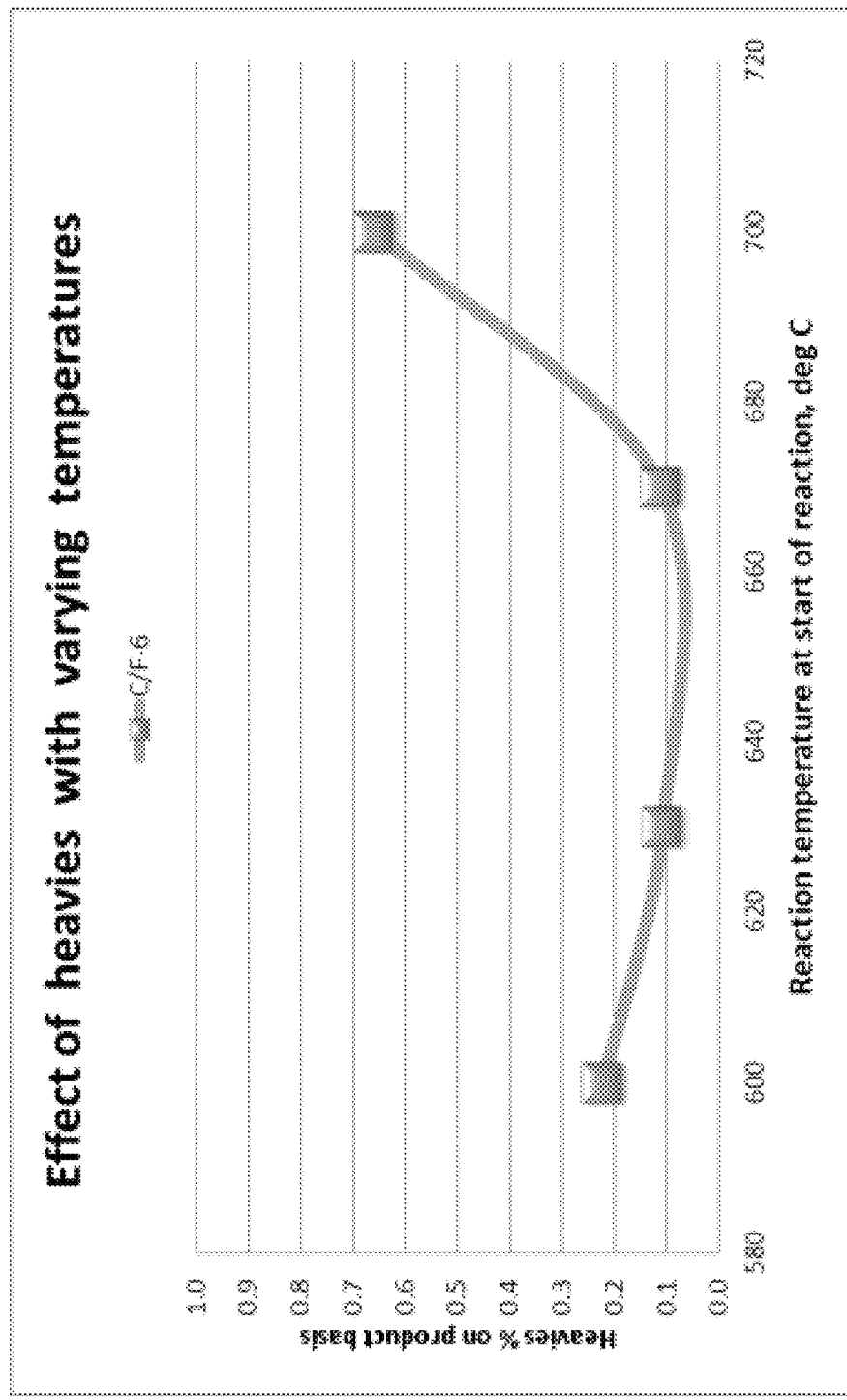
FIG. 8 is a plot of heavy liquid product yields versus reactor temperatures in pyrolysis conversion of a plastic feedstock using a catalyst composition of the invention.

Tests to determine the effect of starting temperatures on the yields of heavy liquid products (i.e., liquid product with a boiling point above 370° C.) were conducted. The catalyst composition was approximately 75% wt. % FCC catalyst and 25 wt. % ZSM-5 zeolite catalyst, using a C/F feed ratio of 6. The results are presented in FIG. 8 and Table 12. As shown in FIG. 8, at an initial reaction temperature of around 670° C. the heavy liquid product is very low, with increasing heavy liquid products being produced as the temperature is increased.

TABLE 12

| Catalyst composition | Wt. % | Spent FCC (75%) + ZSM-5 zeolite catalyst (25%) | Spent FCC (77.3%) + ZSM-5 zeolite catalyst (22.7%) | Spent FCC (75%) + ZSM-5 zeolite catalyst (25%) | Spent FCC (75%) + ZSM-5 zeolite catalyst (25%) |
| --- | --- | --- | --- | --- | --- |
| C/F ratio | g/g | 6.0 | 6.0 | 6.0 | 6.0 |
| Reaction temperature at start | ° C. | 600 | 630 | 670 | 700 |
| Dry catalyst fed | g | 4.49 | 2.99 | 4.49 | 2.99 |
| Feed weight transferred | g | 0.75 | 0.5 | 0.75 | 0.5 |
| Heavies | Wt. % | 0.22 | 0.11 | 0.11 | 0.66 |

Example 10

Figure 9:
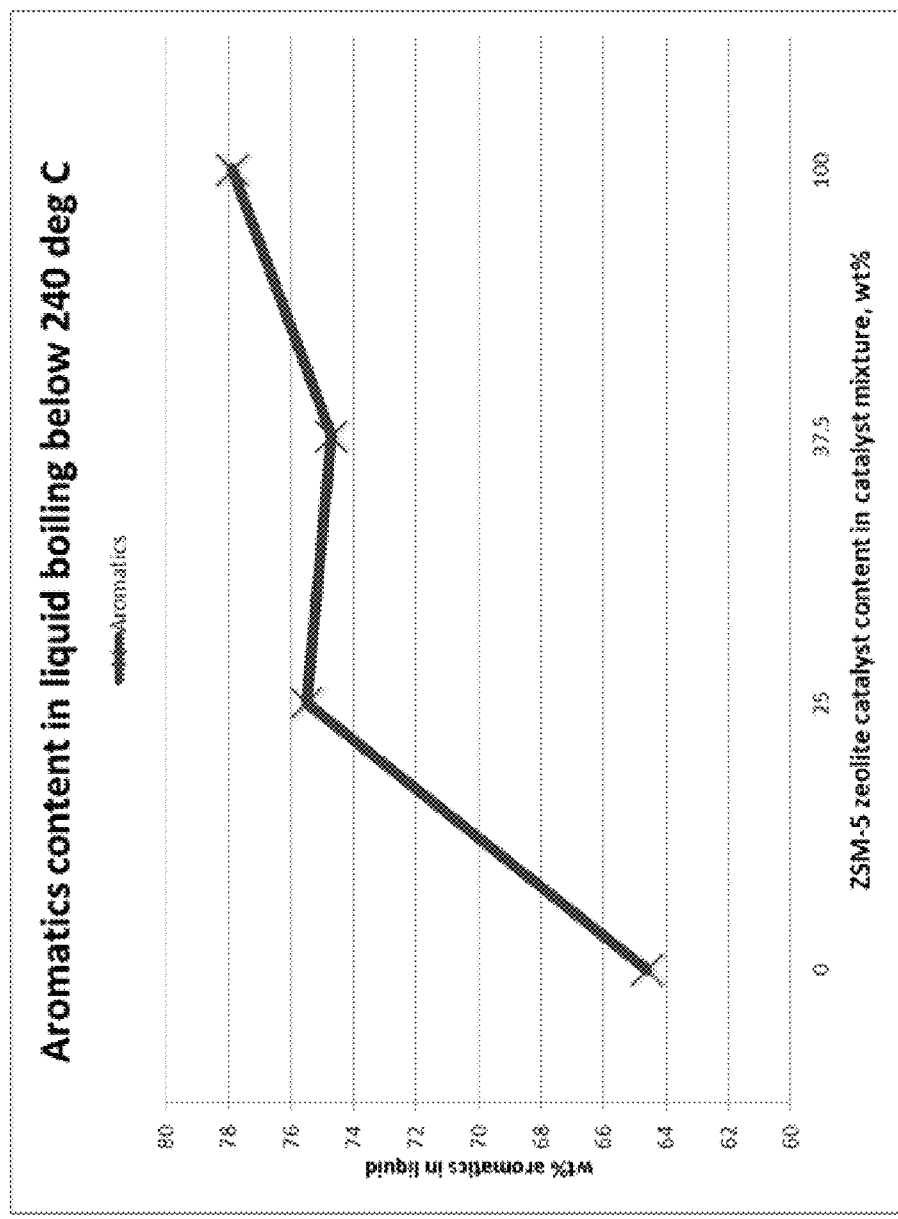
FIG. 9 is a plot of aromatic yields versus ZSM-5 zeolite catalyst content of catalyst compositions used in pyrolysis conversion of a plastic feedstock.

Tests to determine the yields of aromatics as a function of catalyst composition of spent FCC catalyst with varying amounts of ZSM-5 zeolite catalyst (i.e., 0% to 100%) were conducted. Aromatic product content was determined in the liquid product boiling at a temperature below 240° C. The reaction was carried out at a temperature of 670° C. and a C/F ratio of 6. The results are presented in FIG. 9 and Table 13. As shown in FIG. 9, the liquid product is rich in aromatic content, with even higher aromatic content in liquid product being achieved with a ZSM-5 zeolite catalyst content of around 25 wt. % or higher.

TABLE 13

| Catalyst composition | Temperature ° C. | Dry catalyst fed | Feed weight transferred | Aromatic content in liquid, Wt. % |
| --- | --- | --- | --- | --- |
| 100 wt. % Spent FCC | 670 | 9.00 | 1.50 | 64.62 |
| Spent FCC (75 wt. %) + ZSM-5 zeolite catalyst (25 wt. %) | 670 | 8.87 | 1.50 | 75.50 |
| Spent FCC (62.5 wt. %) + ZSM-5 zeolite catalyst (37.5 wt. %) | 670 | 8.95 | 1.50 | 74.71 |
| 100 wt. % ZSM-5 zeolite catalyst | 670 | 8.97 | 1.50 | 77.89 |

Example 11

Figure 10:
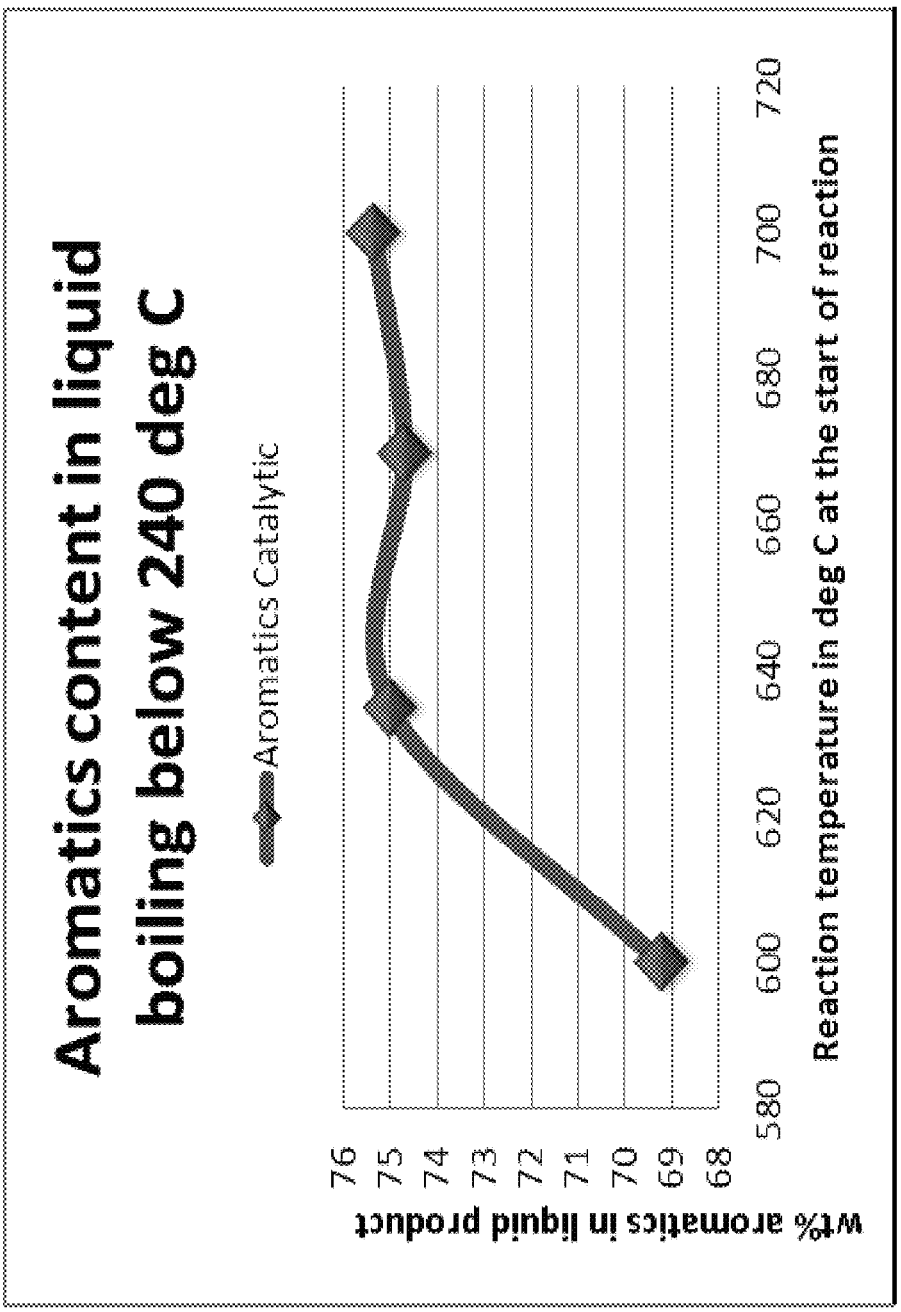
FIG. 10 is a plot of aromatic yields versus reactor temperatures in pyrolysis conversion of a plastic feedstock using a catalyst composition of the invention.

Tests to determine the effect of starting temperatures on the aromatics content in liquid products boiling at a temperature below 240° C. were conducted. The catalyst composition was 62.5 wt. % FCC catalyst and 37.5 wt. % ZSM-5 zeolite catalyst, using a C/F feed ratio of 6. The results are presented in FIG. 10 and Table 14. As can be seen in FIG. 10, higher content of aromatics in liquid product is obtained at temperatures of 635 deg C. or higher.

TABLE 14

| Temperature, ° C. | Dry catalyst fed | Feed weight transferred | Aromatics content |
| --- | --- | --- | --- |
| 700 | 8.95 | 1.50 | 75.37 |
| 670 | 8.95 | 1.50 | 74.71 |
| 635 | 8.95 | 1.50 | 75.03 |
| 600 | 8.95 | 1.50 | 69.23 |

Example 12

Testing was conducted to determine the coke yields based on catalyst composition. The catalyst composition used was spent FCC catalyst with varying amounts of ZSM-5 zeolite catalyst of from 0 wt. % to 100 wt. %. A C/F ratio of 9 was used and the reactor temperature was 670° C. The results are presented in FIG. 11 and Table 15.

TABLE 15

| ZSM-5 zeolite catalyst content in the catalyst mixture | Wt. % | 0 | 25 | 37.5 | 50 | 100 |
| --- | --- | --- | --- | --- | --- | --- |
| C/F ratio | g/g | 9.07 | 9.0 | 9.0 | 9.0 | 8.92 |
| Reaction temperature at start | ° C. | 670 | 670 | 670 | 670 | 670 |
| Dry catalyst fed | g | 6.80 | 6.77 | 6.76 | 6.75 | 6.70 |
| Feed weight transferred | g | 0.75 | 0.75 | 0.75 | 0.75 | 0.75 |
| Coke yield | Wt. % | 5.72 | 4.86 | 4.93 | 4.59 | 4.58 |

Example 13

Test to determine the effect of reactor temperature at the start of the reaction on coke yields were conducted. The catalyst used was 62.5 wt. % FCC catalyst and 37.5 wt. % ZSM-5 zeolite catalyst used at a C/F feed ratio of 9. The results are presented in FIG. 12 and Table 16.

TABLE 16

| Catalyst composition, Wt. % | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) | Spent FCC (62.5%) + ZSM-5 zeolite catalyst (37.5%) |
| --- | --- | --- | --- | --- |
| Reaction set temperature | 700 | 670 | 635 | 600 |
| Dry catalyst fed | 6.75 | 6.76 | 6.77 | 6.80 |
| Feed weight transferred | 0.75 | 0.75 | 0.75 | 0.75 |
| Coke yield, Wt. % | 4.40 | 5.00 | 4.60 | 6.00 |

Figure 11:
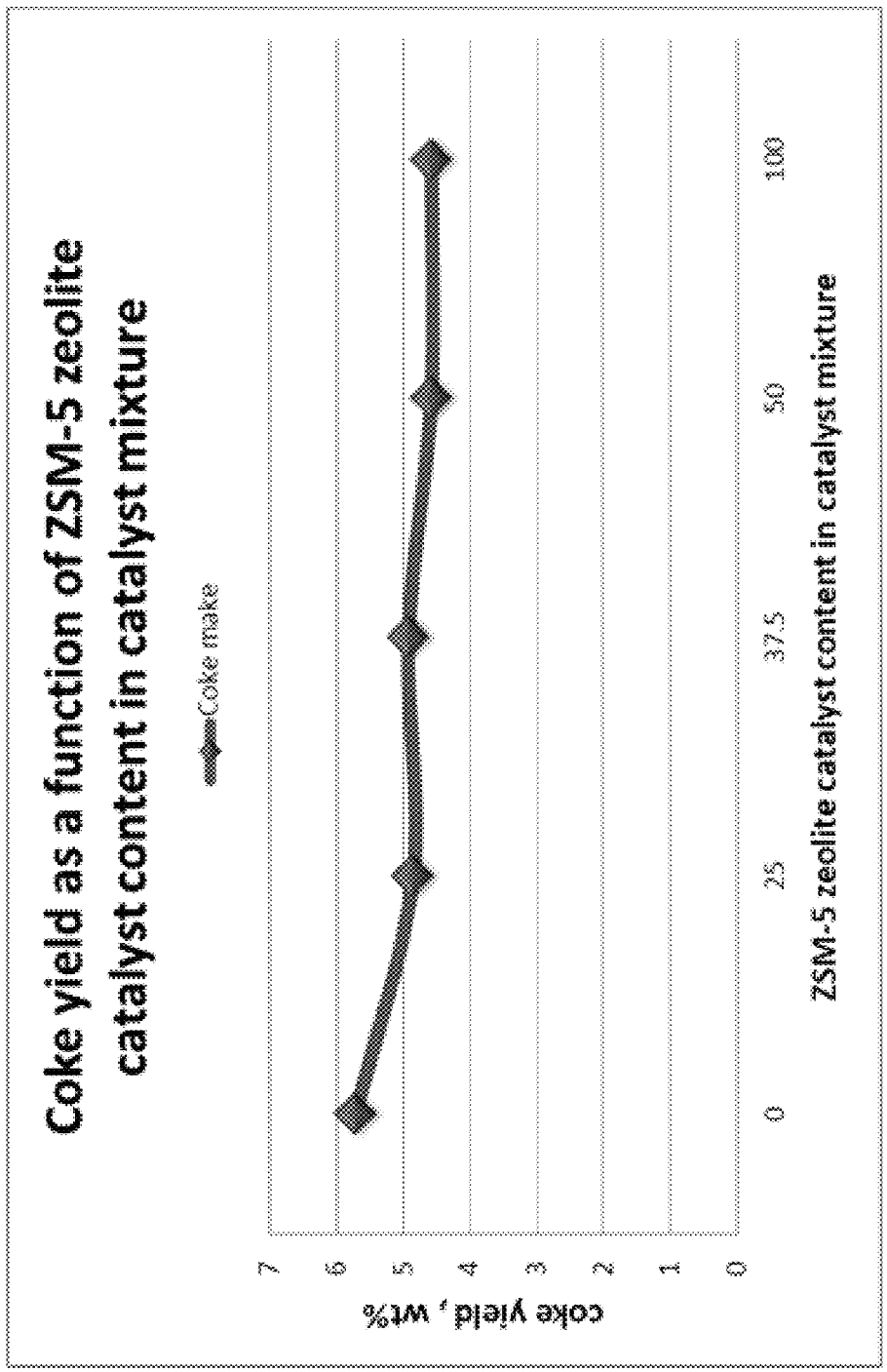
FIG. 11 is a plot of coke yield versus ZSM-5 zeolite catalyst content of catalyst compositions used in pyrolysis conversion of a plastic feedstock.
Figure 12:
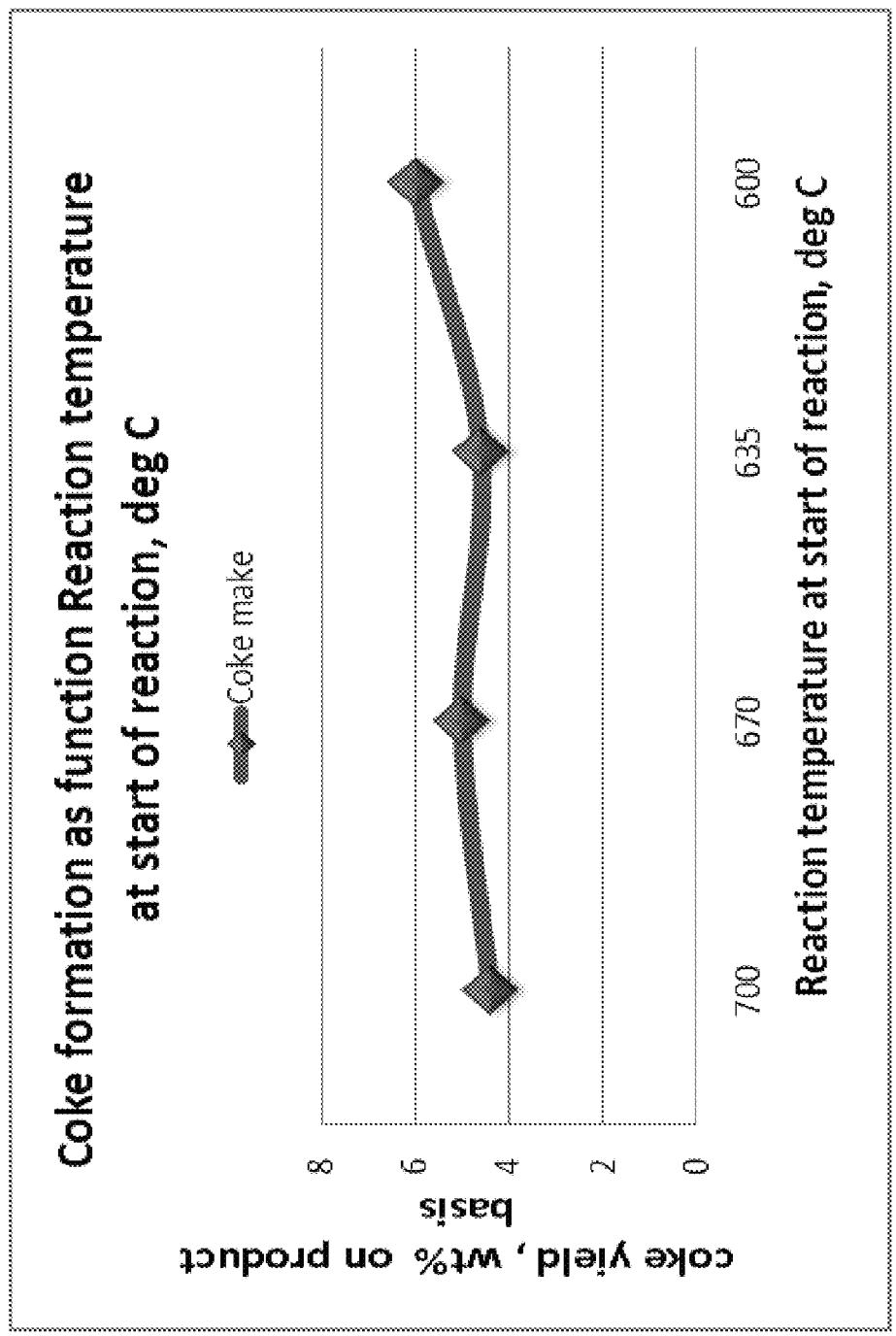
FIG. 12 is a plot of coke yield versus reactor temperatures in pyrolysis conversion of a plastic feedstock using a catalyst composition of the invention.

From FIGS. 11 and 12 of Examples 12 and 13, respectively, it can be seen that the coke yield varies in the region of 4 wt. % to 6 wt. %. In a large scale conversion process like a FCC unit, the heat requirement for the conversion process is met by heat generated by the combustion of coke made by the process and the unit is heat balanced. The amount of coke formation in the pyrolysis conversion process according to the invention is adequate to support the required heat to balance a large scale continuous circulating fluidized bed riser—regenerator operations and hence the coke made in the process is gainfully utilized to support the heat balance. Any deficiency in heat balance can be overcome by injecting heavies (undesired product) or cracked product in the riser (additional olefins and coke make) or firing of heavy products in regenerator (fuel) without utilizing any other auxiliary fuel.

Example 14

Tests were conducted to determine the effect of adding feed separately from the catalyst mixture into the reactor and compared with the case when well mixed feed and catalyst were added together. In the case of separate addition of feed and catalyst, 6 gm of catalyst mixture containing 75 wt. % spent FCC catalyst and 25 wt. % ZSM-5 zeolite catalyst was charged to the reactor and the reactor temperature was allowed to stabilize. At a reaction temperature of 620° C., 1 g of the plastic feed mixture with the composition of Table 3 was charged to the reactor and the products were collected. In the second experiment, the same quantities as above of a well mixed feed and catalyst were charged into a reactor where the start of reaction temperature was 620° C. The products were collected. In both the studies the fluidization $N_2$ gas flow at 150 Ncc/min was employed. The results of these two studies are presented in Table 17 below.

TABLE 17

| Product yields | Catalyst and feed charged separately | Catalyst and feed charged together |
|---|---|---|
| % Gas yield | 45.7 | 47.9 |
| % Liquid yield | 50.4 | 48.0 |
| % Coke yield | 4.0 | 4.1 |
| C4=, wt % | 13.2 | 12.8 |
| C3=, wt % | 14.5 | 16.0 |
| C2=, wt % | 5.0 | 5.6 |
| Total olefins | 32.7 | 34.4 |

Slightly higher conversions were achieved when the feed and catalyst were mixed well and charged, although the conversions are similar. From Table 17, it is clear that for effective utilization of catalyst, it is preferable that the feed and catalyst mixing is uniform. Deeper catalyst beds may therefore not offer sufficient mixing with feed. Hence, good mixing of feed and catalyst, preferably a co-current mixing of feed and catalyst may help in better conversion of feed.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of producing olefins and aromatic compounds from a feedstock, the method comprising:
    contacting a plastic feedstock and a catalyst composition at a temperature of 550° C. or higher, the catalyst composition comprising a fluidized catalytic cracking (FCC) catalyst and a ZSM-5 zeolite catalyst, wherein the amount of ZSM-5 zeolite catalyst makes up at least 10 wt. % of the total weight of the FCC catalyst and the ZSM-5 zeolite catalyst, the feedstock and the catalyst composition being at a catalyst-to-feed ratio of from 6 or greater; and
    allowing at least a portion of the feedstock to be converted to at least one of olefins and aromatic compounds.

2. The method of claim 1, wherein:
    the FCC catalyst is comprised of at least one of an X-zeolite, a Y-zeolite, a USY-zeolite, mordenite, faujasite, nano-crystalline zeolites, MCM mesoporous materials, SBA-15, a silico-alumino phosphate, a gallophosphate, and a titanophosphate.

3. The method of claim 1, wherein:
    the FCC catalyst is comprised of at least one of a Y-zeolite and a USY-zeolite embedded in a matrix, the FCC catalyst having a total surface area of from 100 m²/g to 400 m²/g, coke deposition in an amount of from 0 to 0.5% by weight.

4. The method of claim 1, wherein:
    the FCC catalyst is a non-fresh FCC catalyst having from greater than 0 to 0.5% by weight of coke deposition.

5. The method of claim 3, wherein:
    the FCC catalyst has a total surface area of from 100 m²/g to 200 m²/g.

6. The method of claim 1, wherein:
    the amount of ZSM-5 zeolite catalyst of the catalyst composition makes up from 10 wt. % to 50 wt. % by total weight of the FCC catalyst and the ZSM-5 zeolite catalyst.

7. The method of claim 1, wherein:
    the amount of ZSM-5 zeolite catalyst of the catalyst composition makes up from 30 wt. % to 45 wt. % of the total weight of the FCC catalyst and the ZSM-5 zeolite catalyst.

8. The method of claim 1, wherein:
    the feedstock and the catalyst composition are contacted at a temperature of 570° C. to 730° C.

9. The method of claim 1, wherein:
    the feedstock and the catalyst composition are at a catalyst-to-feed ratio of from 8 or greater.

10. The method of claim 1, wherein:
    the plastic feedstock comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

11. The method of claim 1, wherein:
    the plastic feedstock and the catalyst composition are contacted in a reactor that is at least one of a fluidized bed reactor, bubbling bed reactor, slurry reactor, rotating kiln reactor, and packed bed reactor.

12. The method of claim 1, wherein:
    the FCC catalyst is a non-fresh FCC catalyst having from 0.2% to 0.5% by weight of coke deposition.

13. A method of producing olefins and aromatic compounds from a feedstock, the method comprising:
    contacting a plastic feedstock and a catalyst composition at a temperature of 550° C. or higher, the catalyst composition comprising a fluidized catalytic cracking (FCC) catalyst and a ZSM-5 zeolite catalyst, wherein the amount of ZSM-5 zeolite catalyst makes up at least 10 wt. % of the total weight of the FCC catalyst and the ZSM-5 zeolite catalyst, the FCC catalyst being a non-fresh FCC catalyst having from greater than 0 to 0.5% by weight of coke deposition and having a total surface area of from 100 m²/g to 400 m²/g, the feedstock and the catalyst composition being at a catalyst-to-feed ratio of from 6 or greater; and
    allowing at least a portion of the feedstock to be converted to at least one of olefins and aromatic compounds.

14. The method of claim 13, wherein:
    the FCC catalyst is comprised of at least one of an X-zeolite, a Y-zeolite, a USY-zeolite, mordenite, faujasite, nano-crystalline zeolites, MCM mesoporous materials, SBA-15, a silico-alumino phosphate, a gallophosphate, and a titanophosphate.

15. The method of claim 13, wherein:
    the FCC catalyst is comprised of at least one of a Y-zeolite and a USY-zeolite embedded in a matrix.

16. The method of claim 13, wherein:
    the FCC catalyst is a non-fresh FCC catalyst having from 0.2% to 0.5% by weight of coke deposition.

17. The method of claim 16, wherein:
    the FCC catalyst has a total surface area of from 100 m²/g to 200 m²/g.

18. The method of claim 13, wherein:
    the amount of ZSM-5 zeolite catalyst of the catalyst composition makes up from 10 wt. % to 50 wt. % by total weight of the FCC catalyst and the ZSM-5 zeolite catalyst.

19. The method of claim 13, wherein:
the amount of ZSM-5 zeolite catalyst of the catalyst composition makes up from 30 wt. % to 45 wt. % of the total weight of the FCC catalyst and the ZSM-5 zeolite catalyst.

20. The method of claim 13, wherein:
the feedstock is a plastic feedstock that comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

21. A method of producing olefins and aromatic compounds from a feedstock, the method comprising:
contacting a plastic feedstock and a catalyst composition at a temperature of 550° C. or higher, the catalyst composition comprising a fluidized catalytic cracking (FCC) catalyst and a ZSM-5 zeolite catalyst, wherein the amount of ZSM-5 zeolite catalyst makes from 10 wt. % to 50 wt. % of the total weight of the FCC catalyst and the ZSM-5 zeolite catalyst, the FCC catalyst being a non-fresh FCC catalyst having from 0.2% to 0.5% by weight of coke deposition and having a total surface area of from 100 $m^2/g$ to 200 $m^2/g$, the feedstock and the catalyst composition being at a catalyst-to-feed ratio of from 6 or greater; and
allowing at least a portion of the feedstock to be converted to at least one of olefins and aromatic compounds.

\* \* \* \* \*